United States Patent
Anijs et al.

(10) Patent No.: US 9,833,009 B2
(45) Date of Patent: Dec. 5, 2017

(54) METHOD OF WASHING COCOA BEANS TO IMPROVE THE QUALITY OF THE COCOA PRODUCTS OBTAINED FROM SUCH BEANS

(75) Inventors: Harrold Glenn Anijs, Almere (NL); Ronald Heistek, Zaandam (NL); Hassanein Zaki, Hamburg (DE)

(73) Assignee: Olam International Limited, Singapore (SG)

( * ) Notice: Subject to any disclaimer, the term of this patent is extended or adjusted under 35 U.S.C. 154(b) by 0 days.

(21) Appl. No.: 13/131,280

(22) PCT Filed: Nov. 30, 2009

(86) PCT No.: PCT/US2009/066050
§ 371 (c)(1),
(2), (4) Date: May 26, 2011

(87) PCT Pub. No.: WO2010/063021
PCT Pub. Date: Jun. 3, 2010

(65) Prior Publication Data
US 2011/0229616 A1    Sep. 22, 2011

Related U.S. Application Data

(60) Provisional application No. 61/118,497, filed on Nov. 28, 2008.

(51) Int. Cl.
*A23L 1/10* (2006.01)
*A23G 1/00* (2006.01)

(52) U.S. Cl.
CPC ........... *A23G 1/002* (2013.01); *A23G 1/0006* (2013.01)

(58) Field of Classification Search
CPC ..... A23L 1/36; A23L 1/0151; A23G 2200/08; A23G 3/346; A23G 1/002; A23G 1/0006; A23G 1/02; A23G 2200/14; A23G 3/48; A23G 3/02; A23N 5/00
USPC ............................ 426/465, 460, 507; 99/539
See application file for complete search history.

(56) References Cited

U.S. PATENT DOCUMENTS

| | | | | |
|---|---|---|---|---|
| 2,417,078 | A | * 3/1947 | Jones | 241/48 |
| 3,778,519 | A | * 12/1973 | Taralli et al. | 426/631 |
| 4,314,973 | A | 2/1982 | Aspa et al. | |
| 4,343,818 | A | * 8/1982 | Eggen | 426/45 |

(Continued)

FOREIGN PATENT DOCUMENTS

| | | |
|---|---|---|
| EP | 1106073 A1 | 6/2001 |
| WO | 9733484 A1 | 9/1997 |

(Continued)

OTHER PUBLICATIONS

Kostic, Michael. "Cocoa Alkalization" Jun. 1997 The Manufacturing Confectioner.*

(Continued)

*Primary Examiner* — Katherine D Leblanc
(74) *Attorney, Agent, or Firm* — McDermott Will & Emery LLP

(57) ABSTRACT

Provided are methods of removing contaminants from cocoa beans, reducing free fatty acids in cocoa butter of the cocoa beans or a combination thereof. The methods are accomplished by use of a pre-washing solution placed in contact with the cocoa beans. Cocoa products produced by such methods and systems for performing such methods on cocoa beans are also disclosed.

20 Claims, 8 Drawing Sheets

(56) References Cited

U.S. PATENT DOCUMENTS

| | | | |
|---|---|---|---|
| 4,435,436 A * | 3/1984 | Terink et al. | 426/631 |
| 4,871,562 A | 10/1989 | Terauchi et al. | |
| 5,395,635 A | 3/1995 | Yanamoto et al. | |
| 5,676,993 A | 10/1997 | Watterson et al. | |
| 5,888,562 A * | 3/1999 | Hansen et al. | 426/45 |
| 6,403,133 B1 * | 6/2002 | Barfuss et al. | 426/261 |
| 2002/0034579 A1 | 3/2002 | Biehl et al. | |

FOREIGN PATENT DOCUMENTS

| | | |
|---|---|---|
| WO | 2008/043058 A1 | 4/2008 |
| WO | 2008043058 A1 | 4/2008 |

OTHER PUBLICATIONS

"Pure Prime Pressed Cocoa Butter" Apr. 7, 2003 https://web.archive.org/web/20030407200028/http://www.kokobudi.com.my/products.htm.*

International Cocoa Organization. "Drying Cocoa Beans" Jul. 5 2000.*

English Translation JP 06-98681 Apr. 12, 1994.*

Cargill. "The Colour of Cocoa Powder." Practice Book Cocoa and chocolate. 1997. p. 1-2.*

Gonzalez-Penas et al., A simple chemical method reduces ochratoxin A in contaminated cocoa shells, PubMed, Jul. 2008, pp. 1, Spain.

Gonzalez-Penas et al., A simple chemical method reduces ochratoxin A in contaminated cocoa shells, Journal of Food Protection, vol. 71, No. 7, 2008, pp. 1422-1426, International Association for Food Protection, Spain.

PCT, Written Opinion of the International Searching Authority, pp. 1-4, Jan. 4, 2010, USA.

PCT, International Search Report, pp. 1-4, Jan. 4, 2010, USA.

Bonvehi, Occurrence of Ochratoxin A in Cocoa Products and Chocolate, Journal of Agricultural and Food Chemistry, vol. 52No. 20, Oct. 2001, pp. 6347-6352.

Schnermann et al., Evaluation of Key Odorants in Milk Chocolate and Cocoa Mass by Aroma Extract Dilution Analyses, Journal of Agricultural and Food Chemistry, vol. 45, No. 3, Mar. 1997, pp. 867-872.

Jinap et al., Effect of Drying on Acidity and Volatile Fatty Acids Content of Cocoa Beans, Journal of the Science of Food and Agricultural, Wiley & Sons, Chichester, GB, vol. 65No. 1, May 1994, pp. 67-75.

Amezqueta et al., A simple chemical method reduces ochratoxin A in contaminated cocoa shells, Journal of Food Protection, International Association for Food Protection, US, vol. 71 No. 7, Jan. 2008, pp. 1422-1426.

Hurst et al., High-performance liquid chromatographic determination of ochratoxin A in artificially spiked cocoa beans, Journal of Chromatography, Elsevier Science Publishers B.V., NL, vol. 265, Jan. 1983, pp. 353-356.

European Patent Office, Supplementary European Search Report, EP application No. 09 82 9841, Sep. 2014, pp. 1-9.

Malayasian Office Action issued in Application No. PI 2011002394 dated Mar. 31, 2016.

J.S. Bonvehi, "Occurrence of Ochratoxin A in Cocoa Products and Chocolate," J. Agric. Food Chem., vol. 52, No. 20, 2004, pp. 6347-6352.

Brazilian Technical Opinion issued in Application No. PI0916167-8 dated Dec. 8, 2016, with English translation.

* cited by examiner

METHOD OF WASHING COCOA BEANS TO IMPROVE THE QUALITY OF THE COCOA PRODUCTS OBTAINED FROM SUCH BEANS

CROSS-REFERENCE TO RELATED APPLICATIONS

This application is a national stage entry of International Application No. PCT/US09/66050, filed Nov. 30, 2009, which itself claims priority to U.S. Provisional Patent Application No. 61/118,497, filed Nov. 28, 2008, each of the contents of the entirety of which are incorporated by this reference.

TECHNICAL FIELD

The present invention relates generally to methods of improving the quality of cocoa beans, as well as the products produced therefrom. The present invention further relates to methods of reducing levels of contaminants including, but not limited to, toxins, metals or free fatty acids in cocoa beans and the products produced therefrom. The present disclosure is also directed to compositions comprising the cocoa beans or products produced therefrom. The present disclosure is also directed to systems for improving the quality of cocoa beans and the products produced therefrom.

BACKGROUND ART

The world demand for cocoa products has increased over recent decades, especially for use in chocolate and chocolate products. Cocoa beans and/or portions thereof can be used to make a variety of cocoa products including, but not limited to, cocoa nibs, cocoa liquor, cocoa butter, cocoa presscakes, and/or cocoa powder. Each of these cocoa products can be further refined and/or mixed with other ingredients to create other cocoa products.

The quality of a cocoa product depends partly on the quality of the cocoa beans used to make the cocoa product. The quality of the cocoa beans depends on various conditions during harvest, the fermentation process, the drying process of the fermented beans, as well as shipment and storage conditions of the cocoa beans. The quality of the cocoa beans can also depend on the variety of the cocoa plant from which the beans are obtained, as well as on where that variety is grown. Not all countries grow the same variety or type of cocoa plants and these varieties and types can be distinguished by their differing flavor formation characteristics. Even cocoa beans obtained from identical varieties of cocoa plants can have different characteristics when grown in a different environment or by changes of climate. Cocoa beans of lower quality may vary in different parameters, such as (off-) flavor, degree of fermentation, levels of free fatty acids, or in presence of various contaminants in or on the cocoa beans.

Various contaminants might be present in cocoa products. During storage, molds may grow on cocoa beans, which can lead to the formation of mycotoxins, such as aflatoxins and ochratoxins. Though the formation of aflatoxins in cocoa products can be inhibited by the presence of caffeine and theobromine, high concentrations of these mycotoxins in the cocoa products produced from these contaminated beans can be harmful. Certain metal contaminants also may be present within the cocoa beans, such as lead, iron, aluminum and silicium.

In U.S. Pat. No. 5,676,993, Watterson et al. describe a process for enhancing the cacao flavor obtained from inferior or lower quality cocoa beans. This process comprises roasting combinations of amino acids and reducing sugars with cocoa butter, cocoa liquor, or cocoa nibs derived from the inferior cocoa beans.

In U.S. Pat. No. 4,871,562, Terauchi et al. describe treating cocoa beans or cacao nibs with alkali to extract the water-soluble portion of the cocoa mass. All of the examples provide for alkali treatment of deshelled and/or cracked cocoa beans (or cocoa nibs) or of cocoa mass. The specification of that patent describes the addition of alkali in an amount of about 1% by weight (wt %) to about 2 wt %, where an amount less than 1 wt % yields a low amount of the water-soluble portion and an amount more than 2 wt % results in unreacted alkali in the cocoa mass that can be transferred to the water-soluble portion.

In U.S. Pat. No. 4,704,292, Kattenberg describes a method of preparing cocoa with a color coordinate L of 16 or less and a simple polyhydroxyphenols content of at least about 0.25% by weight. The method comprises moistening whole deshelled cocoa beans or a coarse fraction of cocoa nibs with a hot concentrated alkaline processing liquid, wherein the processing liquid has a concentration equivalent to at least about 20% by weight of $K_2CO_3$.

In United States Publication No. 2002/0034579, Biehl et al. describes a method of producing low-flavor cocoa from unfermented cocoa beans in two steps. In the first step, cocoa beans are treated with an aqueous medium at an increased temperature and/or in the presence of acids to disrupt subcellular structures and inhibit enzymes that produce aroma precursors. In the second step, the cocoa beans are treated with an oxidative environment to oxidize polyhydroxy phenols. After these treatments, the cocoa beans are dried, deshelled, and then conventionally processed into cocoa products.

In International Patent Publication No. WO 97/33484, Arnold et al. describes a method of reducing the acidity of fermented cocoa beans. The method comprises partially deshelling fermented cocoa beans and then drying the beans. The cocoa beans are partially deshelled, wherein the shells are partially removed, opened, or broken. Deshelling can be accomplished by a chemical process, such as by lye-peeling, or by a mechanical process, such as by manual removing or automated scraping, scoring, cracking, crushing, and/or winnowing. The drying process is at an ambient temperature of from 15° C. to 35° C. The method further comprises an optional step of washing the beans before deshelling to remove excess mucilage from the fermented beans.

DISCLOSURE OF INVENTION

Current commercial demands require a cocoa product manufacturer to produce high quality cocoa products. Therefore, there still remains need for methods that improve the quality of cocoa beans.

In one embodiment, a method of removing contaminants from cocoa beans, reducing free fatty acids in cocoa butter of the cocoa beans or a combination thereof comprises placing cocoa beans in contact with a pre-washing solution; removing the cocoa beans from the pre-washing solution; and processing the pre-washed cocoa beans into cocoa liquor; wherein the cocoa liquor produced from the pre-washed cocoa has a reduced amount of metals, a reduced amount of mycotoxins, a reduced amount of free-fatty acids or any combinations thereof as compared to cocoa liquor produced from cocoa beans not placed in contact with the pre-washing solution. The method may further comprise one or more of the following acts: roasting the pre-washed cocoa beans; removing the shell from the pre-washed cocoa beans, thus producing cocoa nibs; grinding the cocoa nibs into the cocoa liquor; removing darker or black cocoa beans from the cocoa beans; rinsing the pre-washed cocoa beans; drying the pre-washed cocoa beans or combinations of any thereof.

In another embodiment, a system for producing a cocoa-containing composition comprises cocoa beans; a pre-washing solution; means for placing the cocoa beans in contact with the pre-washing solution; and washed cocoa beans. The system may further comprise one or more of the following: an apparatus for removing shells from the washed cocoa beans; a grinder for grinding cocoa nibs; cocoa liquor, wherein cocoa butter obtained from the cocoa liquor of the washed cocoa beans has a free fatty acid content less than cocoa butter obtained from cocoa beans not placed into contact with the pre-washing solution; a content of Fe, Al and/or Si in the cocoa liquor is lower than cocoa liquor produced from cocoa beans which are not placed in contact with the pre-washing solution; a heating element for maintaining the pre-washing solution at a temperature between 15° C. to 90° C.; a device for removing darker of black cocoa beans from the cocoa beans; and combinations of any thereof.

Provided herein are methods for washing raw cocoa beans to improve the quality of the cocoa products obtained from these beans. In one embodiment, the methods comprise washing intact cocoa beans in alkali, typically at temperatures lower than 75° C. and at a pH between 9-12, which surprisingly results in substantial improvements in bean quality.

In another embodiment, methods for reducing the free fatty acid content of a cocoa product are disclosed. One method includes washing cocoa beans as described herein. Another method includes color sorting the cocoa beans in order to remove darker or black cocoa beans. Since black or darker cocoa beans may contain higher percentages of free fatty acids, separating or sorting out these darker or black cocoa beans from the remainder of the beans will produce a product lower in free fatty acids. Another embodiment includes sieving cocoa beans to remove fines since the fines may have a higher free fatty acid content than the cocoa beans. The method of sieving may be performed in combination with washing the cocoa beans and/or color sorting the cocoa beans. In yet a further embodiment, a method of improving the quality of cocoa beans includes washing the cocoa beans as described herein in combination with color sorting of the cocoa beans.

A method of improving the quality of cocoa beans is provided. The method comprises: placing cocoa beans in contact with a pre-washing solution; and processing the pre-washed, cocoa beans into cocoa liquor. According to one non-limiting embodiment, the pre-washing solution comprises between 0 wt % to 20 wt % or between 1 wt % to 10 wt % of an alkali. According to certain embodiments, the pre-washing solution has a pH of from 8 to 12.5 and/or is from 15° C. to 90° C. In yet another embodiment, the pre-washing solution has a temperature between 15° C. to 90° C., between 20° C. to 90° C., between 30° C. to 90° C., or between 50° C. to 70° C. According to another non-limiting embodiment, the cocoa beans are contacted with the pre-washing solution for less than thirty minutes or for less than 10 minutes. In another non-limiting embodiment, placing the cocoa beans in contact with the pre-washing solution produces a cocoa liquor having a reduced amount of metals, a reduced amount of mycotoxins, a reduced amount of free-fatty acids or any combinations thereof as compared to a cocoa liquor produced without being placed in contact with the pre-washing solution. In another embodiment, the produced cocoa liquor has a pH of less than 6, and in another embodiment, the produced cocoa liquor has a pH of between 4-6. In a further embodiment, the pre-washed cocoa beans are rinsed. In another, the pre-washed cocoa beans are dried, for example, to a moisture content of less than 12% water or less than 8% water. In one non-limiting embodiment, the pre-washing solution is water, which may be between 50° C. and 75° C.

In certain non-limiting embodiments, processing the pre-washed cocoa beans into cocoa liquor comprises: removing the shell from the cocoa beans, thus producing cocoa nibs; and grinding the cocoa nibs into the cocoa liquor. The cocoa liquor may be further processed into cocoa butter and/or cocoa powder. According to certain non-limiting embodiments, a moisture content of the cocoa nibs is less than 8% water. In additional embodiments, cocoa butter isolated from the cocoa liquor has a free fatty acid content of less than 1.75%.

Also provided is a system for producing a cocoa-containing composition comprising: a container comprising intact cocoa beans; a pre-washing solution; and means for placing the intact cocoa beans in contact with the pre-washing solution. According to one embodiment, the means for placing the intact cocoa beans in contact with the pre-washing solution comprises a reservoir containing the pre-washing solution. The pre-washing solution may comprise between 0 wt % to 20 wt % of an alkali or between 1 wt % to 10 wt % of the alkali, and may have a pH of from 8 to 12.5. In certain non-limiting embodiments, the alkali comprises $K_2CO_3$, $KHCO_3$, potash or combinations of any thereof.

In another embodiment, the system may further comprise an apparatus for sorting black or dark cocoa beans from lighter colored or brown cocoa beans. The systems of the present invention may further comprise an apparatus for sieving the cocoa beans such that fines may be removed from the cocoa beans.

The system may further comprise: an apparatus for removing the shell from the intact cocoa beans; a grinder for grinding cocoa nibs; a press for separating cocoa butter and cocoa powder, and/or cocoa liquor, wherein: cocoa butter isolated from the cocoa liquor has a free fatty acid content of less than 1.75%; a content of Fe, Al and/or Si in the cocoa liquor is lower than cocoa liquor produced from cocoa beans which are not placed in contact with the pre-washing solution; or a combination thereof. The system may further comprise a heating element for maintaining the pre-washing solution at a temperature between 15° C. to 90° C., between 20° C. to 90° C., between 30° C. to 90° C., or between 50° C. to 70° C.

In yet another non-limiting embodiment, a food product is provided comprising a cocoa product prepared according to a method of improving the quality of cocoa beans comprising: placing intact cocoa beans in contact with a pre-washing solution; and processing the pre-washed cocoa beans into cocoa liquor, as described herein. Non-limiting examples of food products include, but are not limited to chocolate, dark chocolate, milk chocolate, semi-sweet-chocolate, baking chocolate, truffles, candy bars, flavoring syrup, confectionery coating, beverages, milk, ice cream, soy milk, cakes, cookies, pies, diet bars, meal-substitute solid foods and beverages, energy bars, chocolate chips, yogurt, pudding, mousse and mole.

In another non-limiting embodiment, cocoa butter is provided comprising less than 1.75% free fatty acids. Cocoa liquor also is provided having an iron content of 50 or less mg/kg, an aluminum content of 20 or less, a silicon content of 0.02% or less by weight, or combinations of any thereof.

BRIEF DESCRIPTION OF THE DRAWINGS

The characteristics and advantages of the present disclosure may be better understood by reference to the accompanying figures.

FIG. 5A shows data for cocoa beans treated with 0 wt % $K_2CO_3$. FIG. 5B shows data for cocoa beans treated with 1 wt % $K_2CO_3$. FIG. 5C shows data for cocoa beans treated with 5 wt % $K_2CO_3$. FIG. 5D shows data for cocoa beans treated with 10 wt % $K_2CO_3$. FIG. 5E shows data for the reference of N-liquor CS-1. FIG. 5F shows data for IC-1 (10 wt % $H_2O$).

FIG. 6A shows data for Trial 1. FIG. 6B shows data for Trial 2. FIG. 6C shows data for Trial 3.

MODES FOR CARRYING OUT THE INVENTION

Figure 1:
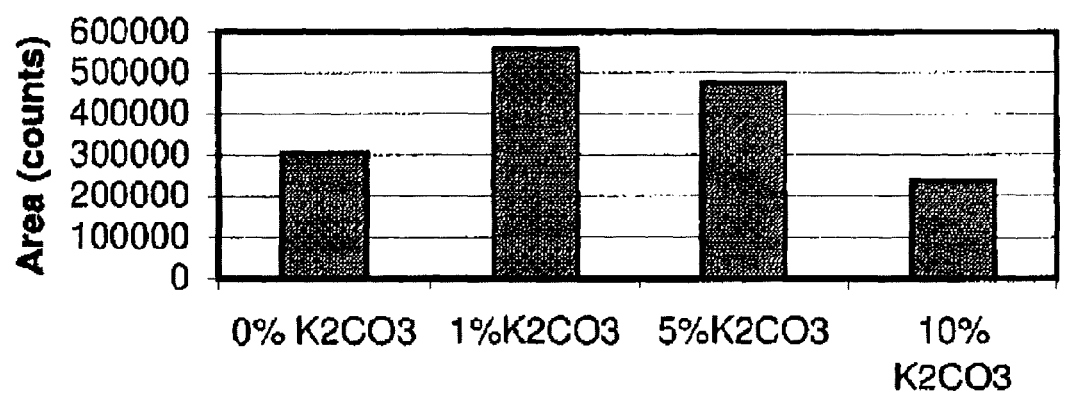
FIG. 1 is a graph showing the presence of Procyanidin B2 in cocoa powder as determined by high performance liquid chromatography (HPLC), where cocoa beans were treated with 0 wt % to 10 wt % $K_2CO_3$.
Figure 2:
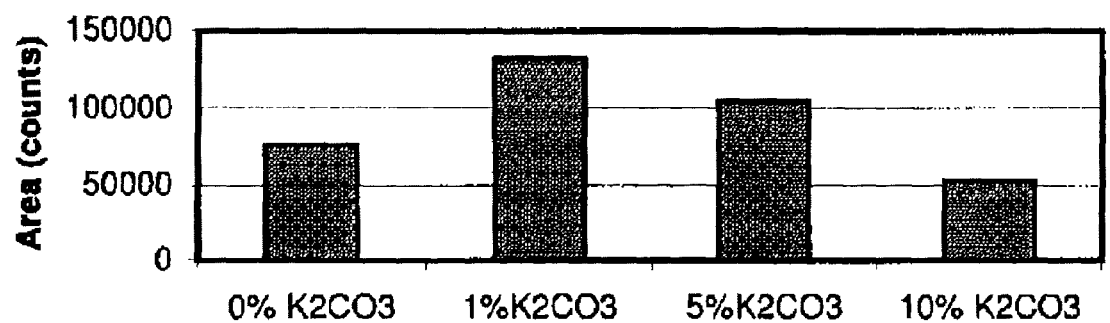
FIG. 2 is a graph showing the presence of Procyanidin B5 in cocoa powder as determined by HPLC, where cocoa beans were treated with 0 wt % to 10 wt % $K_2CO_3$.
Figure 3:
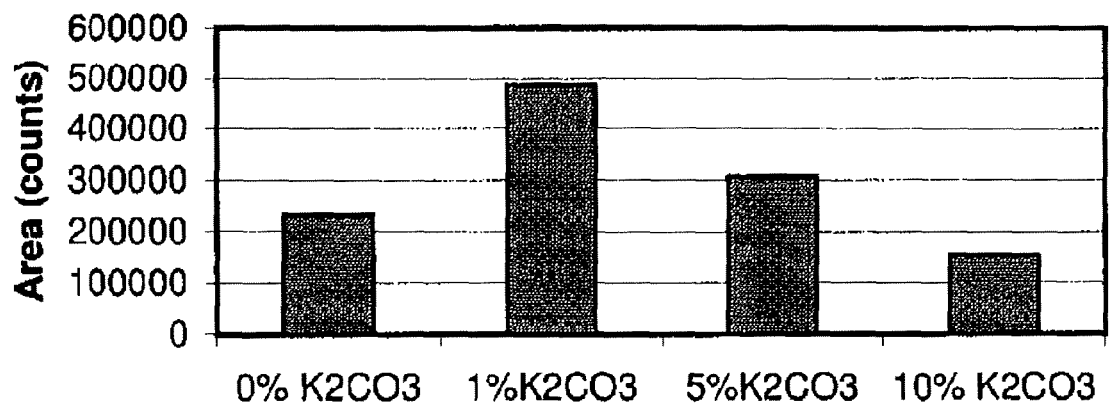
FIG. 3 is a graph showing the presence of Procyanidin C1 in cocoa powder as determined by HPLC, where cocoa beans were treated with 0 wt % to 10 wt % $K_2CO_3$.
Figure 4:
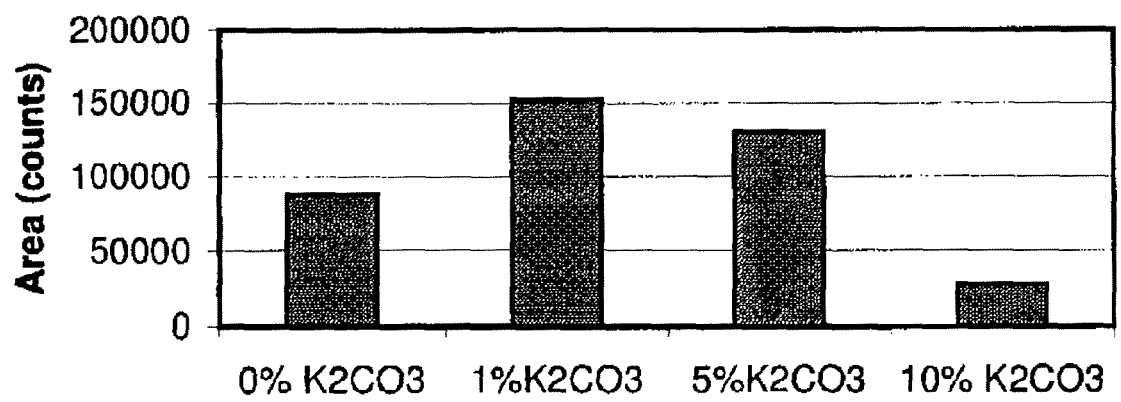
FIG. 4 is a graph showing the presence of Procyanidin D1 in cocoa powder as determined by HPLC, where cocoa beans were treated with 0 wt % to 10 wt % $K_2CO_3$.
Figure 5A:
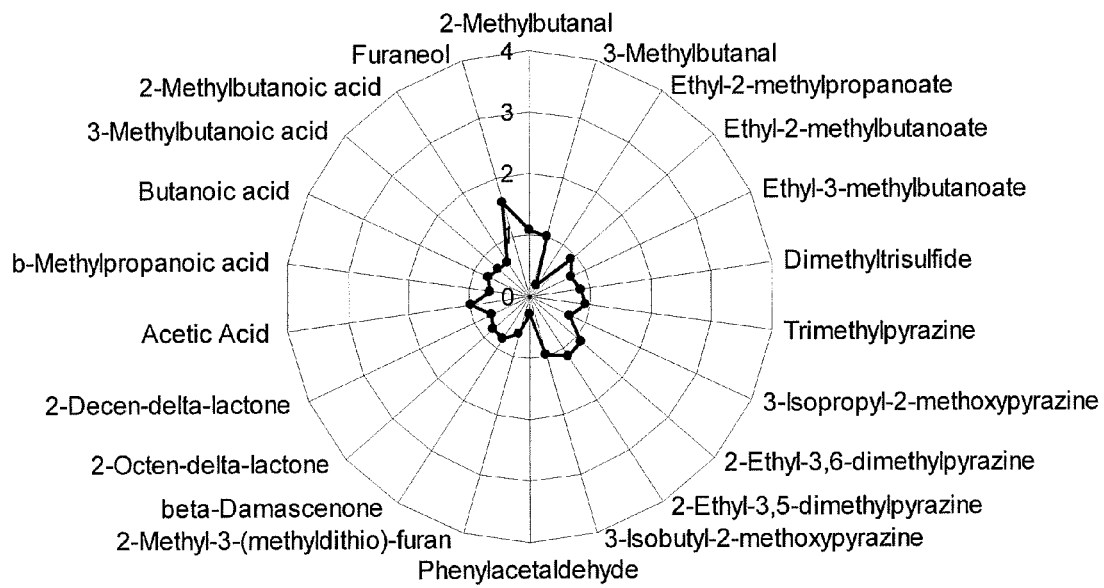
FIG. 5A-5F are graphs showing the relative levels of aroma compounds in cocoa liquor.
Figure 5B:
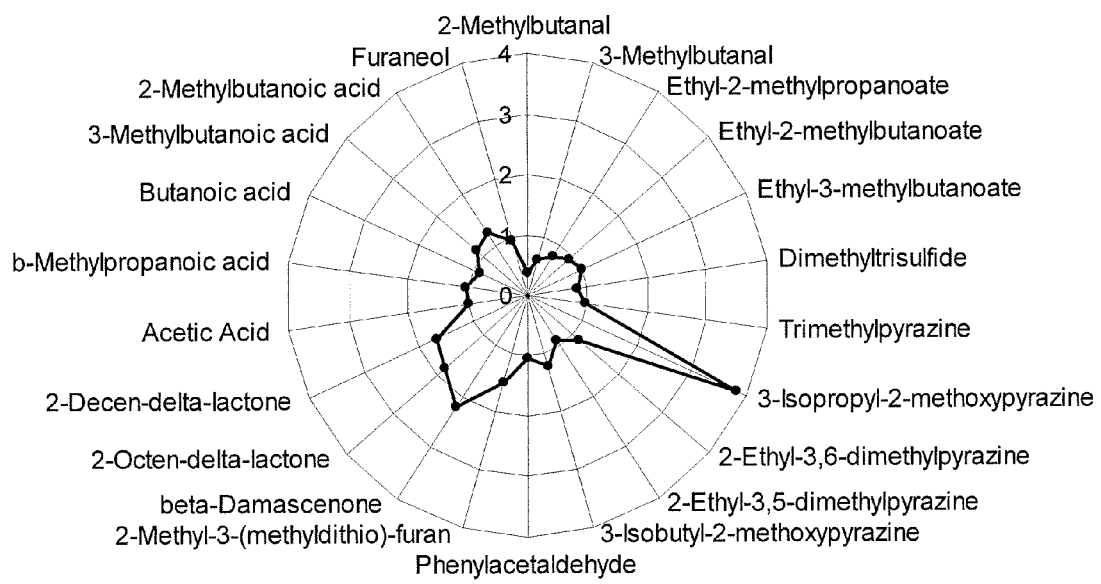
Figure 5C:
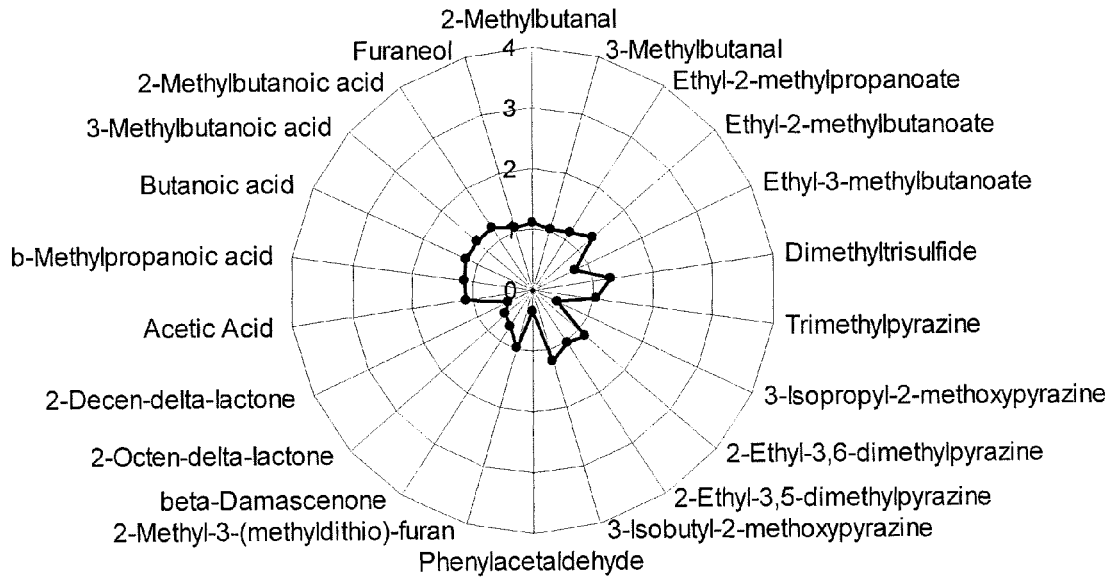
Figure 5D:
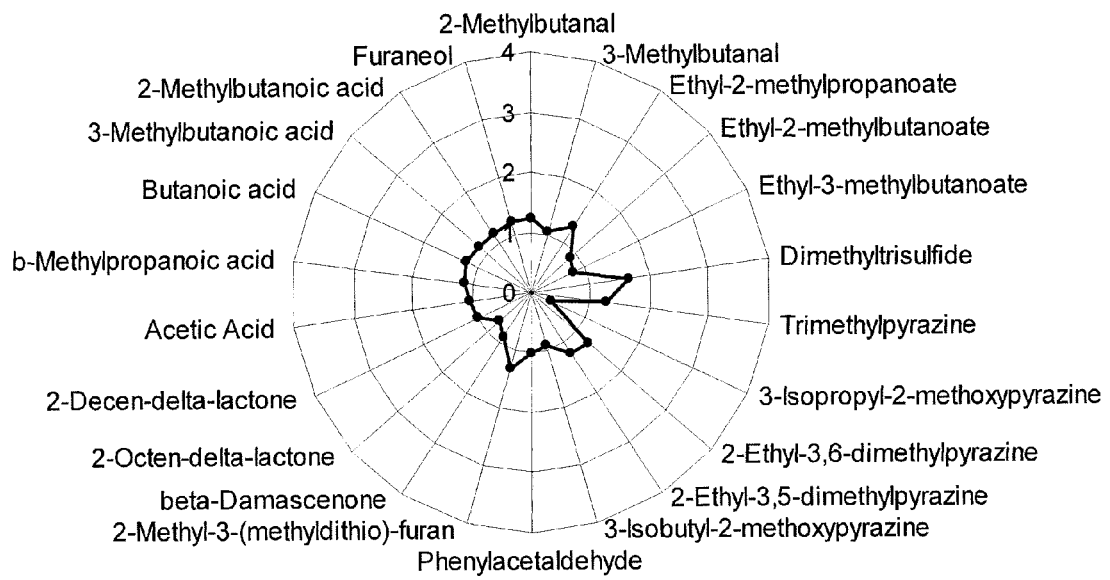
Figure 5E:
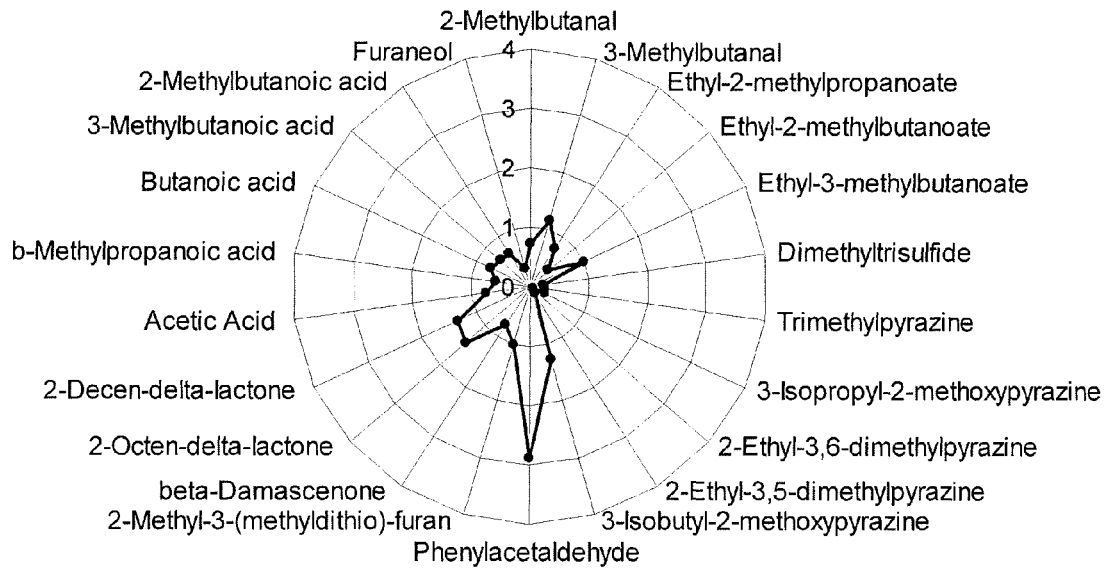
Figure 5F:
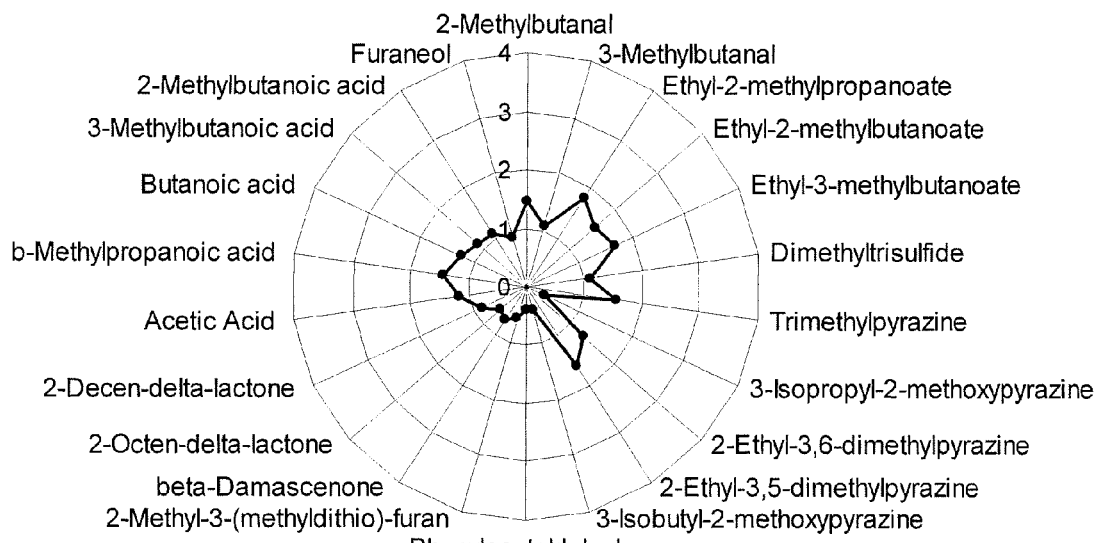

In the present application, including the claims, other than in the operating examples or where otherwise indicated, all numbers expressing quantities or characteristics are to be understood as being modified in all instances by the term "about". Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

As used herein, and unless indicated otherwise, "a" and/or "an" refer to one or more.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

As used herein, "cocoa" includes cocoa beans, portions thereof or products produced from cocoa beans, such as, without limitation, nibs (natural, raw, dried, roasted, un-fermented and/or alkalized), shells, unshelled beans, intact beans, embryos, cotyledons, cocoa powder, cocoa butter, cocoa particles and/or any other product of cocoa bean processing. Cocoa can be further processed to yield, including, without limitation, cocoa liquor, cocoa butter, cocoa powder, and/or chocolate. As used herein, "cocoa beans" includes whole cocoa beans, intact cocoa beans, nibs (natural, raw, dried, roasted, un-fermented and/or alkalized), shells, embryos, cotyledons or combinations thereof, whether roasted or unroasted. At times, the term "beans" may be used to refer to "cocoa bean." "Intact cocoa beans" includes cocoa beans that have not been partially or completely deshelled by a deshelling method. As used herein, "raw cocoa beans" includes cocoa beans that have been harvested and fermented but not roasted.

As used herein, "cocoa liquor" includes chocolate liquor and includes a mixture of cocoa powder and cocoa butter that is obtained from grinding cocoa beans or portions thereof.

As used herein, a "cocoa product" and related terms includes a composition comprising one or more of, without limitation: comminuted cocoa beans, cocoa liquor, cocoa butter, cocoa powder, compounds, compound coatings and/or any other products including a product of cocoa bean processing.

As used herein, "inferior cocoa beans" and "inferior quality" include cocoa beans that are considered to have less desirable qualities from a commercial and/or consumer standpoint. Cocoa beans are often described in terms of their quality, where typical criterions include, without limitation: degree of fermentation; number of defects; number of broken beans; bean count (number per 100 g); flavor; color; fat content; fat quality; shell content; moisture content; uniformity; metal content; presence of toxins; and insect and/or rodent infestation. The cocoa butter should be low in free fatty acids and show specific melting and solidification characteristics.

A non-limiting example of inferior cocoa beans would be cocoa beans that result in cocoa butter with high free fatty acids and nonspecific melting and solidification characteristics. For example and without limitation, cocoa butter should have a free fatty acid ("FFA") content of less than 1.75%. Therefore, inferior cocoa beans may, in one instance, be defined as having a "high" FFA content of at least 1.75% in cocoa butter prepared from the beans. In commercial practice, "inferior cocoa beans" also are identified subjectively, though in an art-recognized manner.

For example and without limitation, the criterion of flavor often is assessed in common commercial practice by an expert panel that grades a consignment, seeking to identify off-flavors. This assessment is multifactorial, relying on the type of bean and its handling, as well as off-flavors, including, but not limited to: moldy off-flavors that may come from molds; smoky taints may come about during drying; acidic off-flavors due to excessive acid created during fermentation or improper drying; or off-flavors can also be caused by the proximity of another strong-smelling product during storage and shipping.

In another non-limiting example, the criterion of shell content is dependent on the type of bean, where Asian beans typically have higher shell content than African beans. Therefore, "inferior cocoa beans" can be determined by expert evaluation, and in many cases, the negative qualities of these inferior cocoa beans can be corrected by the methods described herein.

Some important factors in the formation of the cocoa flavor are cocoa bean variety; fermentation and drying; alkalization; roasting; and combinations of any thereof. With regard to cocoa bean variety, different varieties can have different flavor formation characteristics. For example, the Forastero variety has a greater resistance to diseases and pests but the flavor of the Forastero is less appreciated by chocolate manufacturers. Criollos are light colored with a mild, nutty character. Forastero cocoas are dark brown, strongly flavored, slightly bitter, and have a higher fat content. To combine the flavor of the Criollo varieties and the hardiness of the Forastero, new hybrids were cultivated, including Trinitario varieties. Growing conditions like climate, amount and time of sunshine and rainfall, soil conditions, ripening, time of harvesting, and the time between harvesting and fermentation of the beans all contribute to the flavor formation. Differing conditions may lead to significantly different flavor profiles. A good example is the difference in flavor profile between cocoa produced from beans growing in Ghana and Sabah. Although the variety cultivated in Sabah was originally imported from Ghana, their flavors are completely different.

With respect to fermenting and drying, the processing of cocoa beans can affect the quality of the beans. During fermentation, enzymatic reactions play a principal role in the formation of the cocoa flavor precursors. The chemical processes involved in fermentation are complex and not completely understood. The drying process can affect the flavor as well. For example, hot air dryers are typically used in Asia to dry fermented beans and could result in cocoa products with higher levels of residual acidity and/or higher free fatty acid content that negatively affect the flavor.

As used herein, "high levels" relating to "inferior quality" or "inferior cocoa beans" refer to levels of an inferior quality that results in a cocoa product that is not within specification, for example and without limitation, as set forth in any applicable food-industry regulatory guidelines or food quality guidelines, and/or in view of accepted commercial standards, preferences, practices or trade usage. For example and without limitation, according to certain guidelines, cocoa butter is considered to be within specification if the free fatty acid content is less than 1.75%. Therefore, inferior cocoa beans would be cocoa beans that produce cocoa butter with a free fatty acid content of more than 1.75%. A non-limiting example of high levels of free fatty acid content in inferior cocoa beans is an average value of 4.2% in cocoa butter produced from those beans. In another non-limiting example, cocoa powder is considered to be within a specification promulgated by the European Union if the ochratoxin type A level is less than 2.0 µg/kg (or 2.0 ppb) (only for baby food). Therefore, high levels of ochratoxin type A in inferior cocoa beans would be that which leads to cocoa product with an ochratoxin type A level of more than 2.0 µg/kg. In another non-limiting example, a food product is considered to be within specification (or below the action level) as promulgated by the U.S. Food and Drug Administration if aflatoxin levels in the product are less than 20 ppb. Therefore, high levels of aflatoxin in inferior cocoa beans would be that which leads to cocoa products having an aflatoxin level of more than 4 ppb. (EU)

As used herein, "free fatty acid content" or "FFA" of a cocoa product is made in reference to the amount of oleic acid within the cocoa product, according to commercially-acceptable practice. Typically, FFA is expressed as % oleic acid and is determined by measuring the amount of base needed to neutralize the oleic acid. The FFA can be measured in many different ways. For example and without limitation, the titration method comprises determining the amount of base required to titrate a cocoa product containing oleic acid in reference to a pH indicator compound. In another non-limiting example, the NIR method comprises measuring the near-infrared absorption spectra of a compound and determining whether the signature absorption spectrum of oleic acid is present. As used herein, "fat content" or "% fat" of a cocoa product refers to the percentage amount by mass of fat and other components extractable with petroleum ether from the cocoa product.

Other non-limiting examples of inferior cocoa beans include cocoa beans with unacceptably high levels of contaminants. Contaminants include various chemicals and particles that may be present in cocoa beans. While the amount of some contaminants may be harmful to human health, the amount of other contaminants is undesired for its effect on the characteristics of the cocoa product, such as taste or color. For example and without limitation, contaminants include metals, pesticides, sand, mycotoxins and combinations of any thereof.

Various metals may be present in cocoa products. The presence of ionic iron is inherent to cocoa, given growing, post-harvest, and manufacturing conditions. For example and without limitation, the level of fine particles of metallic iron can be controlled with good manufacturing practices, the use of powerful magnets for removing iron particles from cocoa products, and/or by pre-washing the cocoa beans before processing. As is true with most agricultural crops, trace levels of heavy metals often found in the soil may be found in cocoa. Because cocoa beans from origin countries commonly come into contact with soil, shell removal to the levels specified under regulatory standards is known to help limit the levels of these naturally occurring metals. In one non-limiting example, inferior cocoa beans may have high levels of silicium (sand), lead, and/or aluminum.

Cocoa trees and their fruit are prone to attack by microorganisms and insects. To fight these pests, fungicides, insecticides, and pesticides may be applied but mostly on the cocoa pod and not on the beans themselves. However, action levels for cocoa beans have been promulgated (e.g.) by the U.S. Food and Drug Administration. For example, the insecticide lindane has an action level of 0.5 ppm for whole raw cocoa beans and the insecticides DDT, DDE, and TDE (alone or in combination) have an action level of 1.0 ppm. Since Sep. 1, 2008, the EU has limits on pesticides, fumigants and herbicides (more than 400 components). In one non-limiting example, inferior cocoa beans are pre-washed to decrease the high levels of pesticides and insecticides present on or within the cocoa beans.

Mold growth on cocoa beans occurs on occasion. Some of these molds can produce mycotoxins. This may occur at the farms during growing, harvesting, ripening, fermentation, and drying. It is thus possible that mycotoxins like aflatoxins and ochratoxin A are present on cocoa beans. It is impossible to remove every impurity from cocoa powder during manufacturing. Regulatory authorities have recognized this. For example and without limitation, levels of mycotoxins in cocoa beans can be controlled through careful selection of cocoa beans, handling of raw materials, good manufacturing practices, and/or pre-washing of the cocoa beans. In various other embodiments, the disclosed compositions may be used in magnetic fluid applications. In one embodiment, the disclosed compositions may be used to stabilize magnetic particles in a solvent base, including, but not limited to, a mixture of a base oil and an ester compound. The improved wetting and dispersant properties of the disclosed compositions result in reduced agglomeration of the suspended particles in magnetic fluids without resulting in adverse effects on the viscosity of the fluid.

Described herein are processes to improve the quality of cocoa products and products obtained from those processes. For example and without limitation, the process improves the quality of cocoa products obtained from inferior cocoa beans. In another non-limiting example, the process improves an inferior quality of a cocoa product.

As used herein, "alkali" and related terms includes an alkaline chemical. Non-limiting examples of an alkali includes, but is not limited to, sodium, potassium, ammonium or magnesium hydroxides, carbonates and combinations of any thereof. For example and without limitation, an alkali is potash or $K_2CO_3$, $KHCO_3$, or mixtures thereof. "Alkaline" refers to a pH of greater than 7. As used herein, an "alkali solution" comprises an alkali and a solvent. Non-limiting examples of solvents include, but are not limited to, water, such as demineralized water or tap water. As used herein, alkali solutions can be of various concentrations. For example and without limitation, the alkali solution comprises 0.5 wt % to 20 wt % of the alkali, including any increments therebetween, for example, 1 wt %, 2 wt %, 5 wt %, 10 wt %, and 15 wt %. In another embodiment, the alkali solution comprises a range from 1-5 wt %. For purposes herein, alkali treatment does not include treatment with alkali sufficient to cause deshelling of intact cocoa beans, as is the case with lye peeling. Thus, the alkali treatments described herein may be characterized as "non-peeling alkali treatments", and like terms and phrases, which excludes alkali treatments of sufficient pH, duration, and temperature to effect peeling (deshelling) of the so treated cocoa beans. Therefore, ranges for the washing methods include, without limitation, a pH of between 9-12.5, a pH of between 1o-11.5, for example and without limitation pH=9, 9.5, 10, 10.5, 11, 11.5 and 12, and increments therebetween. Temperature ranges for non-peeling alkali treatments include, without limitation, from 15° C. to 90° C., for instance from 25° C. (room temperature) to 75° C., including 15° C., 20° C., 25° C., 30° C., 35° C., 40° C., 45° C., 50° C., 55° C., 60° C., 65° C., 70° C., 75° C., 80° C., 85° C., and 90° C. and increments therebetween.

As used herein, "pre-wash" and like terms includes contacting raw and/or fermented, intact cocoa beans with a solution. The term "pre-washing solution" includes the solution that is used during the pre-washing process of the cocoa beans. The term "pre-washed cocoa beans" includes cocoa beans that are being or have been previously pre-washed and dried before starting the breaking and winnowing process of the beans.

The pre-washing can be conducted over a range of reaction conditions. The pre-washing step comprises various pre-washing solutions. For example and without limitation, the pre-washing solution is an aqueous (water-containing) solution. Non-limiting examples of aqueous solutions include, but are not limited to, water, such as demineralized water or tap water, or alkali solutions, such as 1 wt % $K_2CO_3$ or 10 wt % $K_2CO_3$. The pre-washing can be conducted at various temperatures. A non-limiting range of temperature for the pre-washing is 15° C. to 75° C., including any increments therebetween, for example, 20° C., 25° C., 30° C., 35° C., 40° C., 45° C., 50° C., 55° C., 60° C., 65° C., and 70° C. The pre-washing can be conducted for various lengths of time. In one non-limiting embodiment, the pre-washing is conducted for less than one hour or less than half an hour. In yet another non-limiting embodiment, the pre-washing is conducted for five minutes.

As used herein, the term "rinse" and like terms includes contacting pre-washed cocoa beans with a solution. The term "rinsing solution" includes the solution that is used during the rinsing process. Non-limiting examples of rinsing solutions include, without limitation, aqueous solutions, such as demineralized water or tap water. The rinsing can be conducted at various conditions. A non-limiting range of temperature for the rinsing is 15° C. to 75° C., including any increments therebetween, for example, 20° C., 25° C., 30° C., 35° C., 40° C., 45° C., 50° C., 55° C., 60° C., 65° C., and 70° C. The rinsing can be conducted for various lengths of time. In one non-limiting embodiment, the rinsing is conducted for less than one hour or less than half an hour. In yet another non-limiting embodiment, the rinsing is conducted for five minutes.

During the treatment of the cocoa beans, the rinsing is optional. For example and without limitation, cocoa beans are pre-washed in 1 wt % $K_2CO_3$ for less than one hour and rinsed in water for less than one hour. In another non-limiting example, cocoa beans are pre-washed in water for less than one hour and not rinsed. In yet another non-limiting example, the cocoa beans are pre-washed in 1 wt % $K_2CO_3$ for less than one hour and not rinsed.

In another non-limiting embodiment, the pre-washed cocoa beans are dried. For example and without limitation, the cocoa beans are dried to have a moisture content less than 10 wt % water.

Procyanidins belong to a broad class of polyphenols, including, but not limited to, polymeric and oligomeric polyphenols. Procyanidin B2 is a dimer with a formula of epicatechin-(4β→8)-epicatechin. Procyanidin B5 is a dimer with a formula of epicatechin-(4β→6)-epicatechin. Procyanidin C1 is a trimer with a formula of epicatechin-(4β→8)-epicatechin-(4β→8)-epicatechin. Procyanidin D1 is a tetramer with a formula of epicatechin-(4β→8)-epicatechin-(4β→8)-epicatechin-(4β→8)-epicatechin.

As used herein, a "system" includes an apparatus or a combination of apparatuses that achieves a specific goal. A non-limiting example of a system is a processing or manufacturing line comprising components required to carry out a desired process.

Described herein are systems for producing cocoa products from cocoa beans. An apparatus is "configured into a system" if it is part of a process line and is upstream or downstream in a process line from other members of a process line or system. Apparatus configured into a system are connected in an appropriate manner by a path within the system, which can be, without limitation a pipe, tube, trough, conveyor, belt, baskets, pneumatics, or any other means and/or mechanism by which a composition or item of manufacturer is transferred from apparatus to apparatus in a process line.

Figure 7A:
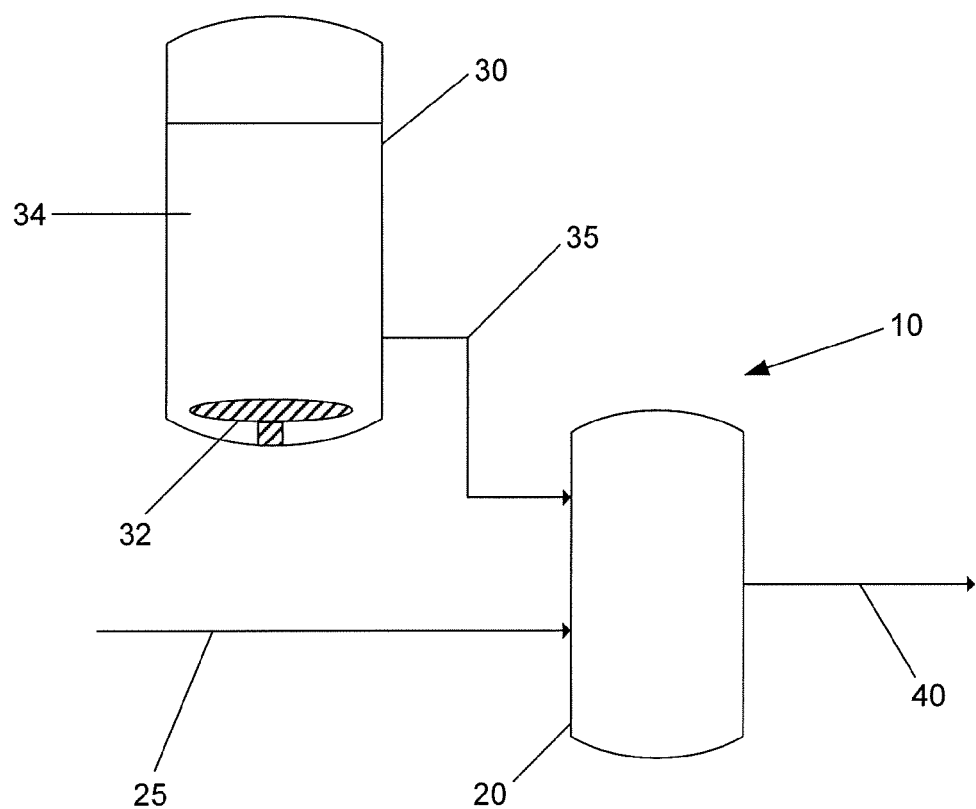
FIG. 7A is a schematic flow diagram of a first system for treating cocoa beans according to one non-limiting embodiment of the methods provided herein.

FIG. 7A is a schematic diagram of one non-limiting embodiment of a system 10 for producing a cocoa product. System 10 comprises a container 20 in which intact cocoa beans are treated with an alkaline pre-washing solution. Cocoa bean feed 25 is shown, which represents any suitable conduit for feeding cocoa beans into container 20, including pipes, tubes, conveyors, or even an opening or inlet into container 20 though which cocoa beans can be fed. Reservoir 30 is shown as having a heating element 32, which optionally can be a jacket heater, and containing pre-washing solution 34. Feed 35 is a fluid conduit, such as a pipe, tube, trough, spillway or opening between reservoir 30 and container 20. Where applicable, feed 35 can contain an in-line valve (not shown), such as a solenoid valve, to control flow of pre-washing solution 34 into container 30. A mixing means, such as an impeller, shaker or rollers (not shown) may be employed in connection with the container 20 in order to mix beans and pre-washing solution 34. An exit feed 40 is provided, by which beans are removed from the container 20, which may comprise pipes, tubes, conveyors, or even an opening or outlet from container 20 though which cocoa beans can be removed.

Figure 7B:
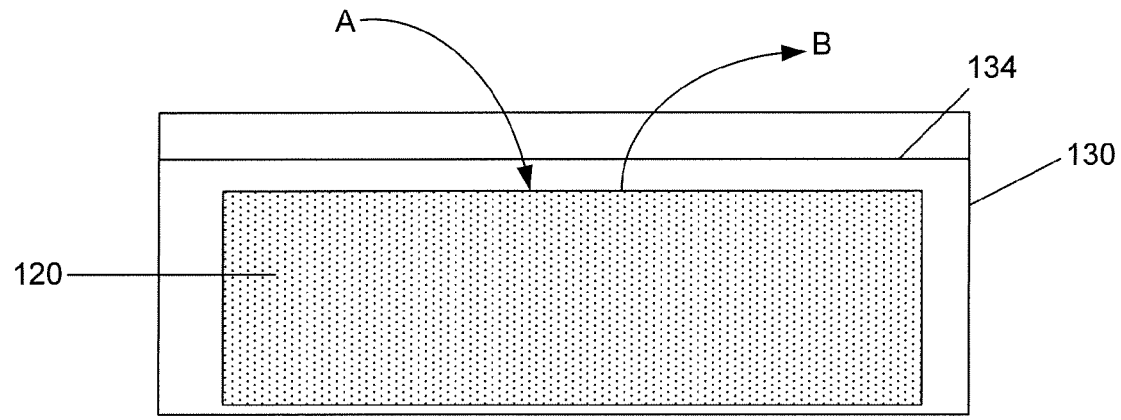
FIG. 7B is a cross-sectional schematic of another non-limiting embodiment of a system for treating cocoa beans as described herein.

As can be appreciated by those of ordinary skill in the art, the size, shape, and physical relationships between elements of the system 10 depicted in FIG. 7A can vary greatly as a matter of design choice. In one non-limiting embodiment of the system depicted in FIG. 7A depicted schematically in FIG. 7B, the container is a perforated box 120 for holding cocoa beans, which is inserted "A" into reservoir 130 below a surface of pre-washing solution 134 in order to immerse the cocoa beans within perforated box 120 into pre-washing solution 134 for a desired time period. Afterwards, perforated box 120 is removed "B" from reservoir 130 for rinsing and/or drying of the cocoa beans.

In reference to systems and methods described herein, the term "feed" includes the action of transferring a substance, item, composition, compound, article, etc. into or from an element of a system such as a container, vessel, box tank, etc. and can be accomplished by any method, including by pipes, tubes, conveyors, belts, cars, spillways, troughs or manually. Likewise, the term "feed" may include the physical construct by which a substance, item, composition, compound, article, etc. can be transferred into or from an element of a system such as a container, vessel, box tank, etc., and can comprise pipes, tubes, conveyors, belts, cars, spillways, troughs or manual items, such as shovels, wheelbarrows, etc.

The system can be configured with one or more apparatuses to further process the pre-washed cocoa beans. One or more apparatuses can be configured downstream of the system comprising the pre-washing solution, where the apparatuses are connected in an appropriate manner by a path within the system, which can be, without limitation a pipe, tube, trough, conveyor, belt, baskets, pneumatics, or any other means and/or mechanism by which a composition or item of manufacturer is transferred from apparatus to apparatus in a process line. For example and without limitation, an apparatus for removing the shell from the intact cocoa beans is configured into the system downstream of exit feed 40 of FIG. 7A. In yet another non-limiting example, one or more apparatuses for preparing cocoa liquor is placed downstream of the apparatus comprising the pre-washing solution. Examples of apparatuses for preparing cocoa liquor include, without limitation, one or more of a winnower, grinder, mixer, roller, conche, press, or cooler.

The system may further comprise a device for sorting darker or black cocoa beans from the lighter or brown cocoa beans. The system may further comprise a device for sieving the cocoa beans in order to remove fines from the cocoa beans.

Cocoa products are typically used in a food product. The food product can comprise one or more other components, including, without limitation: milk and/or milk powder, sugar(s), non-nutritive sweeteners, flour(s), flavorings, colorants, rheology modifiers, preservative(s), vitamin(s), supplement(s), nutraceutical(s), herbal(s), food(s), nut(s), fruit(s), additive(s), stabilizer(s), emulsifying agent(s), protein(s), carbohydrate(s), oil(s), and any other ingredient(s). Example of food products include, but are not limited: chocolate, dark chocolate, milk chocolate, semi-sweet-chocolate, baking chocolate, truffles, candy bars, flavoring syrup, confectionery coating, beverages, milk, ice cream, beverage mixes, smoothies, soy milk, cakes, cookies, pies, diet bars, meal-substitute solid foods and beverages, energy bars, chocolate chips, yogurt, pudding, mousse and mole. Provided therefore are food products, such as, without limitation, those products described above, prepared with a cocoa product disclosed herein.

EXAMPLES

The following exemplary, non-limiting examples are provided to further describe the embodiments presented herein. Those having ordinary skill in the art will appreciate that variations of these Examples are possible within the scope of the invention.

Described herein are examples to reduce the various types of contaminants of cocoa beans, as well as to increase the qualities of inferior cocoa beans. During the processing of cocoa pods into fermented cocoa beans as raw material for cocoa products, the cocoa beans can be contaminated and the quality deteriorated depending on the way they are handled this process of harvesting fermentation, and transportation. Various types of contaminants can be reduced with this method including, but not limited to, mycotoxins, including alfatoxins and ochratoxins; metals, such as iron, aluminum, silicium, sand, and lead; pesticides. Various qualities of the cocoa product can be improved, such as the content of free fatty acids.

These methods provide a way to improve the quality of the beans by washing these beans either with water or with diluted alkaline solutions in a range of concentrations between 0 and 10 wt % alkali. Due to these beneficial effects, a wider choice of raw cocoa beans can be used without sacrificing the quality to the end product. For example, inferior cocoa beans would typically lead to inferior cocoa products, such as cocoa powder, cocoa liquor, and/or cocoa butter with inferior qualities. However, the process disclosed herein would allow for using more inferior cocoa beans, which would provide higher quality cocoa products while promoting economical use of all types of cocoa beans available on the market.

Example 1. Preparation of Raw Cocoa Beans

Methods.

Raw cocoa beans were pre-washed in a potash solution and washed with demineralized water. The concentration of the potash solution varied between 0 wt % and 10 wt %. The temperature was 70° C. during the washings. After the washing and rinsing steps, the cocoa beans were roasted, deshelled, and broken into nibs. The nibs were further processed into various cocoa products, such as cocoa liquor, cocoa butter, and cocoa powder. These cocoa products were also further analyzed, as described herein.

Equipment.

A drying oven (Heraeus, type: T-5042) with circulating air was used to sterilize and prepare the pre-washed beans. A direct contact jet roaster (laboratory scale fluidized bed dryer/roaster) was used to roast the cocoa beans in a closed cabin by hot dry air at constant air pressure and temperature. Since most of the heat remains in the heating cabin, it was possible to dry or roast the product at temperatures between 80° C. and 120° C.

The shell samples were further ground to the desired fineness in a Retch cutting mill (type ZMI) using a sieve of 0.5 mm holes. A household coffee mill was used for the first grinding of the roasted nibs. A laboratory mortar mill (Retch type RMO) was used for the second (fine) grinding of the cocoa liquor.

Raw Materials and Reagents.

100% of Ivory Coast type-1 beans were used with an average free fatty acid content of 1.7%. The beans were taken from a cargo ship and were used in the factory for the N-liquor production. The pre-washing solutions were prepared at the following weight percents (wt %) in demineralized water at 70° C.: 0 wt % (no alkali added, only demineralized water); 1 wt %; 5 wt %; and 10 wt %.

Reaction Conditions.

The reaction cycles included the following steps.

First, cocoa beans were pre-washed in two steps. In the first step (or the washing step), about 300 grams of cocoa beans were washed with 600 grams of pre-washing solution for 5 minutes. The pre-washing solutions were prepared in demineralized water at the following concentrations: 0 wt % $K_2CO_3$; 1 wt % $K_2CO_3$; 5 wt % $K_2CO_3$; and 10 wt % $K_2CO_3$. In the second step (or the rinsing step), the cocoa beans were rinsed for 5 minutes in 600 grams of 100% demineralized water. The average temperature of the liquids was 70° C. during these steps. Table 1 shows the pH of both solutions after these two steps.

TABLE 1 pH of both solutions after washing and rinsing the cocoa beans.

| | Pre-washing solutions (wt % $K_2CO_3$) | | | |
|---|---|---|---|---|
| | 0% | 1% | 5% | 10% |
| after first washing step with $K_2CO_3$ | 5.43 | 10.26 | 10.91 | 11.23 |
| after second rinsing step with pure | 5.63 | 9.07 | 10.13 | 10.37 |

Second, the cocoa beans were sterilized and dried. After the pre-washing step, the beans were stored in a petri dish, which was placed in a hot stove at 80° C. during 30 minutes.

Third, the cocoa beans were dried in a jet roaster at temperatures between 90° C. and 120° C. The drying time and temperature depended on the origin of the beans and also on the moisture content. For example, Ivory Coast Type 1 cocoa beans with a 35-55 wt % moisture content after washings, the drying time was 30 min and the temperature was 120° C.

Fourth, the beans were deshelled to produce cocoa nibs. After drying the beans, the shells could be easily removed from the dry beans, the deshelled beans were broken into smaller particles (nibs).

Fifth, the cocoa nibs were jet roasted. The nibs were roasted in a jet roaster for 15 minutes at 120° C. During the roasting of the beans and nibs, most of the flavor compound stays inside the product because of low roasting temperature.

Sixth, the roasted cocoa nibs were ground into cocoa liquor. The roasted nibs were first coarsely ground in a household coffee mill. In charges of 100 grams at the time, the nibs were further ground to fine cocoa liquor with desired fineness in the mortar mill.

Seventh, some of the finely ground cocoa liquor was hydraulically pressed. The pressing pot was heated to 90° C. together with the liquor sample of about 60 grams. The sample was added to the pot, where the pressing pot with the sample was put into the laboratory hydraulic press. Pressing was continued for 15 minutes while increasing the pressure from 100 to 230 bar. The cocoa butter was collected from the press and filtered over a Whatman paper filter. After pressing, the residual cocoa presscake of about 35 grams was released from the pressing pot. This presscake was broken into small pieces and ground to desired fineness in the cutting mill.

Eighth, some of the cocoa liquor was defatted. To determine the presence of oligomeric-polyphenols in the liquor and also for the measurements of fat content in the liquor, an amount of 10 grams cocoa liquor was defatted with an isopar solution in a small cylinder under low air pressure (1-2 Bar).

Analyses.

The pH of the suspension in water was measured by standard, industry-accepted methods. The beans, nibs, and shells were analyzed for moisture content (or % $H_2O$), which is the percentage loss of mass on drying for 4 hours at 103° C. and measured as a weight percentage (wt %).

Conclusions.

After pre-washing of the beans, the moisture content of the shells increased to almost 40 wt % to 55 wt % before even starting the sterilization and preparation process (see Table 2). After preparation, the average moisture content of the shells was 45 wt %. Due to this higher moisture content, extra energy will be required for the drying process, where the moisture content of the shells is reduced to 10%. By using a jet roaster (fluidized bed dryer), the moisture content of the shells was reduced from 55 wt % to 7.5 wt % in 30 minutes at a roasting temperature of 120° C. The drying process the jet roaster makes it possible to form typical aroma compounds in the cocoa liquor due to Maillard reactions at low temperature and at constant air pressure. After the drying process, deshelling the beans is easier if the shells have low moisture content (<12 wt %).

Additional factors could be considered to further optimize the reaction conditions. For example, avoiding the use of fine particles under 1 mm and brushing the cocoa beans during the washing step to remove sand.

TABLE 2

Moisture contents (in wt %) of the solid parts.

| | Pre-washing solutions (wt % $K_2CO_3$) | | | | IC-1 |
|---|---|---|---|---|---|
| | 0% | 1% | 5% | 10% | 10 wt % $H_2O$ |
| Beans before washing and rinsing | 5.57 | 5.57 | 5.57 | 5.57 | 5.57 |
| Beans after washing and rinsing | 49.7 | 53.53 | 50.7 | 50.7 | |
| Beans after preparation | 43.9 | 46.5 | 45.7 | 44.2 | 14.97 |
| Nibs after drying | 4.05 | 4.79 | 4.81 | 3.26 | 2.05 |
| Nibs after roasting | 0.89 | 1.17 | 1.11 | 1.03 | 0.54 |
| Shells after drying | 7.89 | 7.15 | 6.89 | 7.51 | 4.7 |

IC-1 refers to Ivory Coast beans type 1 treated with 10% water on lab scale.

Example 2. Effect of Pre-Washing on Cocoa Liquor and Cocoa Shells

Analyses.

Analyses for pH and moisture content (or % $H_2O$, as measured in wt %) were carried out as described in the previous Example (for cocoa liquor the Karl Fisher method was used). The fat content (Fat %) was determined according to the densitometric method. The wet sieve residue (75μ) of cocoa liquor was determined by measuring the mass percentage of the composition that does not pass through a sieve with apertures of 75 μm×75 μm. The wet sieve residue (125μ) of cocoa liquor was determined by measuring the mass percentage of the composition that does not pass through a sieve with apertures of 125 μm×125 μm. Levels of iron, aluminum, and silicon were determined in cocoa liquor.

Cocoa beans were prepared as described in Example 1. Levels of aflatoxins and ochratoxins were determined in the cocoa liquor and in the cocoa shells.

Conclusion.

Table 3 shows various characteristics of the cocoa liquor for different pre-washing conditions, as compared to the reference values for N-liquor CS-1 (processed liquor from cocoa beans without washing). As compared to the reference, the contents of the metals were lower for iron (Fe), aluminum (Al) and silicon (Si) than for normally processed cocoa. In addition, no detrimental effects were found for pH, moisture content, and fat content.

TABLE 3

Results of the measurements of the cocoa liquor from all experiments.

| | Pre-washing solutions (wt % $K_2CO_3$) | | | | N-liquor CS-1 | IC-1 |
|---|---|---|---|---|---|---|
| | 0% | 1% | 5% | 10% | (reference) | 10 wt % |
| pH | 5.66 | 5.93 | 5.86 | 6.05 | 5.76 | 5.15 |
| % Fat | 56.4 | 55.78 | 56.41 | 55.67 | 54.35 | 57.84 |
| % $H_2O$ | 1.06 | 1.07 | 1.03 | 0.91 | 0.85 | 0.8 |
| Sieve residue (125 | 0.03 | 0.06 | 0.11 | 0.07 | 0.11 | 0.07 |
| Sieve residue (75 | 0.33 | 0.24 | 0.45 | 0.41 | 0.32 | 0.37 |
| Iron (mg/kg) | 30 | 30 | 30 | 30 | 190 | 40 |
| Aluminum (mg/kg) | 10 | 10 | 10 | 20 | 60 | 20 |
| Silicon (wt %) | <0.01 | <0.01 | <0.01 | <0.01 | 0.04 | 0.02 |
| Aflatoxin-B1 | <1.0 | <1.0 | <1.0 | <1.0 | <1.0 | <1.0 |
| Aflatoxin-B2 | <1.0 | <1.0 | <1.0 | <1.0 | <1.0 | <1.0 |
| Aflatoxin-G1 | <1.0 | <1.0 | <1.0 | <1.0 | <1.0 | <1.0 |
| Aflatoxin-G2 | <1.0 | <1.0 | <1.0 | <1.0 | <1.0 | <1.0 |
| Ochratoxin-A | <0.1 | <0.1 | <0.1 | <0.1 | 0.1 | <0.1 |

N-liquor CS 1 is liquor made in the factory, which was used as a reference sample.

Pre-washing the beans with a dilute potash solution in water could wash out or destroy the molds from the beans, which will lead to a reduction of these toxins on the shells and in the cocoa liquor. As shown in Table 4, treatment with potash solution led to decreased levels of ochratoxin in cocoa shells. As shown in Table 3, no toxins were found in the cocoa liquor from the washed beans.

TABLE 4

Results of the analysis for toxins in cocoa shells.

| | Pre-washing solutions (wt % $K_2CO_3$) | | | | N-liquor CS-1 | I.C-1 | self |
|---|---|---|---|---|---|---|---|
| | 0% | 1% | 5% | 10% | (reference) | 10 wt % | made |
| Aflatoxin-B1 (μg/kg) | <1.0 | <1.0 | <1.0 | <1.0 | <1.0 | <1.0 | <1.0 |
| Aflatoxin-B2 (μg/kg) | <1.0 | <1.0 | <1.0 | <1.0 | <1.0 | <1.0 | <1.0 |
| Aflatoxin-G1 (μg/kg) | <1.0 | <1.0 | <1.0 | <1.0 | <1.0 | <1.0 | <1.0 |
| Aflatoxin-G2 (μg/kg) | <1.0 | <1.0 | <1.0 | <1.0 | <1.0 | <1.0 | <1.0 |
| Ochratoxin-A (μg/kg) | 0.7 | 2.6 | 2.0 | 0.6 | 1.1 | 2.9 | 1.4 |

* from raw cocoa beans, shell peeled of the beans without treatment.

Example 3: Effect of Pre-Washing on Polyphenols of the Cocoa Product

Analyses.

Oligomeric polyphenols were determined by an HPLC method. The dry fat free cocoa powder from the liquor was analyzed for the presence of oligomeric polyphenols using high performance liquid chromatography ("HPLC," type Waters 6000). The HPLC was connected with: a) Hypersil column type 5μ-C18, size: 250×4.60 mm; b) an autosampler (type Waters 717 plus); c) a photodiode array detector (type Waters 996); and d) a solvent degasser unit (type Pio Lab SDU 2006).

Conclusion.

Cocoa beans were prepared as described in Example 1. Pre-washing with a potash solution did not destroy the polyphenols in the cocoa liquor, as evidenced by polyphenol levels determined from cocoa powder of the cocoa liquor. Higher levels of polyphenols were obtained with the 1 wt % and 5 wt % potash solution (see FIGS. 1-4 and Table 5). The potash solution was only in contact with the shells of the beans for a short time. Therefore, the solution would be less likely to penetrate the shells into the nucleus of the beans. As polyphenols are present in the nucleus of the beans and not in the shells, the polyphenols would not likely be destroyed during the pre-washing step with potash solutions.

TABLE 5

Analysis of the polyphenols of the cocoa powder.

| Condition | Procyanidin B2 (dimer) | Procyanidin B5 (dimer) | Procyanidin C1 (trimer) | Procyanidin D1 (tetramer) |
|---|---|---|---|---|
| 0% $K_2CO_3$ | 305.824 | 75.781 | 231.434 | 87.884 |
| 1% $K_2CO_3$ | 558.777 | 131.648 | 486.401 | 152.154 |
| 5% $K_2CO_3$ | 474.116 | 104.976 | 306.094 | 129.583 |
| 10% $K_2CO_3$ | 237.964 | 53.161 | 153.929 | 27.748 |

These results were different than expected. Powders that were pre-washed with either 1 wt % $K_2CO_3$ or 5 wt % $K_2CO_3$ contained more oligomeric procyanidins than in the powders that were pre-washed with either 0 wt % or 10 wt % $K_2CO_3$ solution. In the literature, the alkalization of the nibs destroys oligomeric procyanidins. Without wishing to be limited by theory, the short contact time between the $K_2CO_3$ solution and the whole beans likely inhibited the penetration of the alkali into the nucleus of the beans and the reaction of the alkali with the polyphenols within that nucleus.

Example 4: Effect of Pre-Washing on Aroma Compounds of the Cocoa Liquor

Analysis.

Various aroma compounds were determined by gas chromatography-mass spectrometry (GC-MS).

Conclusion.

Cocoa beans were prepared as described in Example 1. The aroma compounds within the cocoa liquor were detected with GC-MS, where Table 6 provides data for various aroma compounds. The pre-washing step influenced some of the aroma compounds of the cocoa liquor. FIG. 5A-5F show the levels of aroma compounds in cocoa liquor relative to the value in the column labeled "Average of all samples" in Table 6. Relative values were obtained by taking the actual determined values and dividing it by the values of the average of all samples.

TABLE 6

Summary of the analyses of the aroma compounds (μg/kg) in the cocoa liquor.

| Aroma compounds | Pre-washing solutions (wt % K$_2$CO$_3$) | | | | N-liquor CS-1 | IC-1 | Average of |
|---|---|---|---|---|---|---|---|
| | 0% | 1% | 5% | 10% | (reference) | 10 wt % H$_2$O | all samples |
| 2-Methylbutanal | 2032.93 | 715.99 | 2115.30 | 2353.45 | 1380.22 | 2759.46 | 1892.89 |
| 3-Methylbutanal | 3760.55 | 2237.05 | 3907.04 | 3854.79 | 4249.68 | 4034.11 | 3673.87 |
| Ethyl-2-methylpropanoate | 0.87 | 3.10 | 4.59 | 5.27 | 3.01 | 7.26 | 4.02 |
| Ethyl-2-methylbutanoate | 11.99 | 12.08 | 17.52 | 11.48 | 5.53 | 20.38 | 13.16 |
| Ethyl-3-methylbutanoate | 17.23 | 22.49 | 18.10 | 18.23 | 22.65 | 38.82 | 22.92 |
| Dimethyltrisulfide | 195.45 | 191.22 | 301.89 | 387.60 | 52.76 | 253.36 | 230.38 |
| Trimethylpyrazine | 1959.03 | 2061.63 | 2253.93 | 2662.18 | 506.53 | 3350.60 | 2132.32 |
| 3-Isopropyl-2- | 2.98 | 15.26 | 1.70 | 1.41 | 1.16 | 1.40 | 3.99 |
| 2-Ethyl-3,6-dimethylpyrazine | 377.36 | 375.76 | 392.31 | 434.53 | 18.63 | 437.81 | 339.40 |
| 2-Ethyl-3,5-dimethylpyrazine | 349.31 | 260.02 | 308.46 | 362.71 | 38.91 | 479.64 | 299.84 |
| 3-Isobutyl-2-methoxypyrazine | 2.78 | 3.46 | 3.48 | 2.55 | 3.62 | 1.21 | 2.85 |
| Phenylacetaldehyde | 10.30 | 36.38 | 12.30 | 35.26 | 99.91 | 13.96 | 34.68 |
| 2-Methyl-3-(methyldithio)- | 5.88 | 13.78 | 9.04 | 12.05 | 9.21 | 5.16 | 9.19 |
| beta-Damascenone | 3.41 | 9.03 | 2.91 | 3.61 | 3.13 | 2.80 | 4.15 |
| 2-Octen-delta-lactone | 71.71 | 167.96 | 55.32 | 64.24 | 132.46 | 54.50 | 91.03 |
| 2-Decen-delta-lactone | 43.30 | 102.44 | 25.63 | 59.69 | 82.99 | 51.25 | 60.88 |
| Acetic Acid | 230575.83 | 228402.96 | 257555.48 | 242075.34 | 177748.74 | 271213.19 | 234595.21 |
| b-Methylpropanoic acid | 2312.19 | 3609.90 | 3936.04 | 3928.37 | 2068.81 | 5063.31 | 3486.44 |
| Butanoic acid | 205.84 | 236.34 | 331.19 | 326.77 | 196.51 | 336.84 | 272.25 |
| 3-Methylbutanoic acid | 2429.82 | 4101.79 | 4285.94 | 4123.73 | 2400.55 | 3949.39 | 3548.54 |
| 2-Methylbutanoic acid | 1949.52 | 3643.55 | 3593.42 | 3502.08 | 1984.52 | 3222.58 | 2982.61 |
| Furaneol | 1496.95 | 868.08 | 1024.33 | 1160.15 | 276.93 | 824.96 | 941.90 |

Example 5: Effect of Pre-Washing on Color of the Cocoa Powder and Cocoa Liquor

Analyses. The instrumental color evaluation of cocoa powder as such or as a slurry in water is expressed in L*-, C*- and h-values measured with a color spectrophotometer. The L*-, a*-, and b*-values are calculated from the CIE X-, Y- and Z-values using the CIE 1976 equations. C*- and h-values are calculated from the a*- and b*-values according to the following:

$$C^* = \sqrt{(a^{*2} + b^{*2})}$$

$$H = \arctan(b^*/a^*).$$

The L* value indicates the lightness/darkness coordinate, where a low value indicates a dark color, a high value indicates a light color. The a* value indicates the red/green coordinate, with +a* indicating red and −a* indicating green. The b* value indicates the yellow/blue coordinate, with +b* indicating yellow and −b* indicating blue. The C* value indicates the chroma coordinate, indicating brightness, where a higher value indicates a brighter color. The h value indicated the hue angle, where a lower value indicates increased redness and a higher value increased yellowness. The spectrophotometer used in these Examples is a Datacolor Spectraflash 500 Color spectrophotometer with measuring geometrics d/8—specular excluded, illuminant D65, observer angle 10°, quartz flow cuvette, and tubing pump system.

The following protocol was used to measure the intrinsic color of the cocoa powders in water. Cocoa beans were prepared as described in Example 1. About 7.5±0.1 g of cocoa powder were mixed with 100 ml of demineralized water at 50° C. to form a smooth slurry. After continuous stirring for 10 minutes, an additional 50 ml of demineralized water at room temperature was added. After continuous stirring for one minute, the suspension was pumped through the quartz flow cuvette and the L*-, C*- and h-values were read and recorded with a calibrated color spectrophotometer.

The following protocol was used to measure the extrinsic color of dry cocoa powders. A quartz cuvette was filled with the cocoa powder sample and tamped down carefully. Additional cocoa powder was added filling the entire cuvette evenly. The cuvette was placed against the illuminated window do the calibrated spectrophotometer, which read and recorded the L*-, C*- and h-values.

TABLE 7

Summary of color measurements for various cocoa products.

| | Pre-washing solutions (wt % K$_2$CO$_3$) | | | | N-liquor CS-1 | IC-1 |
|---|---|---|---|---|---|---|
| | 0% | 1% | 5% | 10% | (reference) | 10 wt % H$_2$O |
| Color of the cocoa powder (intrinsic color in Water) | | | | | | |
| L | 25.17 | 25.3 | 24.84 | 24.72 | 25.82 | 24.8 |
| C | 28.22 | 28.3 | 27.82 | 27.78 | 24.88 | 27.86 |
| H | 53.59 | 54.49 | 53.37 | 53.33 | 53.62 | 53.57 |
| Color of the cocoa powder (Dry color) | | | | | | |
| L | 45.74 | 46.06 | 46.15 | 45.24 | 47.22 | 47.49 |
| C | 28.2 | 27.65 | 27.35 | 27.51 | 27.93 | 26.61 |
| H | 57.87 | 58.45 | 58.37 | 57.93 | 59.31 | 58.14 |
| Color of the defatted liquors (compared with N-liquor from CS-1 BMW as | | | | | | |
| L | 15.54 | 15.85 | 15.28 | 15.5 | 15.32 | 14.79 |
| C | 18.85 | 18.82 | 18.49 | 18.05 | 17.32 | 18.03 |
| H | 37.67 | 38.22 | 37.76 | 38.52 | 38.26 | 36.54 |

Conclusion.

Table 7 shows various color measurements of the cocoa powder and cocoa liquors for different pre-washing conditions, as compared to the reference values for N-liquor CS-1 (processed liquor from cocoa beans without washing). The different pre-washing conditions did not detrimentally affect the color of the cocoa products.

Example 6: Effect of Pre-Washing on Cocoa Butter

Analysis.

The free fatty acid content (FFA), expressed as % oleic acid, was determined by determining the amount of base needed to neutralize oleic acid. The iodine value (IV) of cocoa butter was determined by the Wijs method, where IV is the number of grams of halogen absorbed by 100 g of fat and expressed as the weight of iodine.

Conclusion.

Cocoa beans were prepared as described in Example 1. This example demonstrated that high amounts of the FFA value in the cocoa beans can be reduced by pre-washing of the beans. Very surprisingly, pre-washing had a strong effect on FFA, particularly when alkaline solutions were used for the washing of the beans. Table 8 shows that the FFA of the cocoa butter was reduced, which meant that the quality of the butter was improved by washing the beans with alkali and water before further processing.

TABLE 8

Results of the analysis of the cocoa butter.

| | Pre-washing solutions (wt % $K_2CO_3$) | | | | N-liquor CS-1 | IC-1 |
|---|---|---|---|---|---|---|
| | 0% | 1% | 5% | 10% | (reference) | 10 wt % $H_2O$ |
| FFA | 1.4 | 0.85 | 0.79 | 0.76 | 1.43 | 1.05 |
| IV | 35.1 | 34.9 | 34.8 | 34.8 | 34.98 | 35.7 |

Example 7: Scale-Up Trials for Preparing and Pre-Washing Raw Cocoa Beans

Methods.

Generally, the scaling pre-washing trials used charges of 100 kg to 200 kg of Ivory Coast beans with high free fatty acid content ("FFA"). First, the beans were stored in a big wooden box with a perforated bottom. Second, the beans were washed in either tap water or potash solution and rinsed in a hot tap water bath. The concentration of the potash solution was 5 wt %. The temperature was 20° C. or 60° C. during the washings and rinsing. After the washing and rinsing steps, the cocoa beans were dried with air. The dried beans were further processed into various cocoa products, such as cocoa liquor, cocoa butter, and cocoa powder. These cocoa products were also further analyzed, as described below.

Equipment.

For scaling up the pre-washing and drying of the cocoa beans, big wooden boxes were filled with 100 to 1,000 kg of cocoa beans. Reservoirs were filled with 4,000 liters of water into which two wooden boxes filled with cocoa beans can be placed simultaneously. After the washing and rinsing steps, blowers with a capacity of 10,000 m³/hour were used to supply dry air for drying the cocoa beans.

After the scaling up the pre-washing and drying process, the cocoa beans were further processed on a laboratory scale. A breaker, winnower and sieve were used to produce nibs and shell from the dry beans. A drying oven with circulating air was used to sterilize and prepare the nibs. A direct contact jet roaster (laboratory scale fluidized bed dryer/roaster) was used to roast the beans in a closed cabin by hot dry air at constant air pressure and temperature. Since most of the heat remains in the heating cabin, it was possible to dry or roast the product at temperatures between 80° C. and 120° C.

A household coffee mill was used for the first grinding of the roasted nibs. A laboratory mortar mill (Retch type RMO) was used for the second (fine) grinding of the cocoa liquor. A hydraulic press was used to separate the cocoa liquor into cocoa butter and cocoa presscakes. A Retsch cutting mill was used to pulverize the cocoa presscakes into powder using sieves with holes of 0.5 and 0.25 mm.

Raw Materials and Reagents.

100% of Ivory Coast beans were used with an average free fatty acid content of 4.2%. Alkali solutions were prepared at 5 wt % in tap water at 60° C.

Reaction Conditions.

For trial 1, a charge of 200 kg Ivory Coast beans with high FFA was used. First, the cocoa beans were stored in a big wooden box with a perforated bottom. Second, the cocoa beans were washed in a cold tap water bath of 15° C. for 5 minutes. Third, the cocoa beans were dried with air of 22° C. to 25° C. for 120 minutes. The temperature of the inlet air was 17° C. and relative humidity of the inlet air was 80%.

For trial 2, a charge of 100 kg to 200 kg of Ivory Coast beans with high FFA was used. First, the cocoa beans were stored in a big wooden box with a perforated bottom. Second, the cocoa beans were washed in a hot tap water bath of 60° C. for 5 minutes. Third, the cocoa beans in the wooden box were dried with air of 22° C. to 25° C. for 110 minutes. The temperature of the inlet air was 20° C. and relative humidity of the inlet air was 70%.

For trial 3, a charge of 100 kg to 200 kg of Ivory Coast beans with high FFA was used. First, the cocoa beans were stored in a big wooden box with a perforated bottom. Second, the cocoa beans were washed in a 5 wt % $K_2CO_3$ pre-washing solution of 60° C. for 5 minutes. Third, the cocoa beans were rinsed in a hot tap water bath of 60° C. for 5 minutes. Fourth, the cocoa beans in the wooden box were dried with air of 22° C. to 25° C. for 120 minutes. The temperature of the inlet air was 20° C. and relative humidity of the inlet air was 70%.

For reference, a charge of 100 kg to 200 kg of Ivory Coast beans with high FFA was used. These cocoa beans were not pre-washed or rinsed.

Analyses.

The beans, nibs, and shells were analyzed for moisture content (or % $H_2O$), which is the percentage loss of mass on drying for 4 hours at 103° C. and measured as a weight percentage (wt %).

TABLE 9

Moisture contents (wt %) of solid parts and breaking behavior of the dried beans.

| Samples | Trial 1 | Trial 2 | Trial 3 | Reference |
|---|---|---|---|---|
| Whole beans | 5.28 | 7.95 | 8.44 | 5.04 |
| Shells | 12.84 | 18.18 | 18.44 | 11.77 |
| Raw nib mix | 6.02 | 8.34 | 8.63 | 6 |
| Breaking behavior of the dry beans | good | bad | bad | good |
| Nibs after sterilization | 16.9 | 16.5 | 16.6 | 16.7 |
| Nibs after jet roasting | 1.02 | 0.95 | 1.03 | 0.98 |

Conclusions.

One possible disadvantage of pre-washing of the beans is that the moisture content of the shells may increase to almost 35 wt % to 55 wt % after the washing and/or rinsing steps. As shown in trials 2 and 3 within Table 9, the breaking behavior of the beans was inefficient due to the high moisture content of the shells and nibs. After the first breaking step, almost 30% of the beans were still not broken into pieces as these beans were too soft and could bow very easy. The beans were finally broken after several breaking attempts.

To reduce this high amount of moisture content to 10 wt % to 12 wt %, the cocoa beans can be dried in hot air (>100° C.). This will need extra energy and a longer drying time. However, drying the beans will promote the further processing of the beans into other cocoa products. To promote good breaking and winnowing behavior of the pre-washed cocoa beans, cocoa beans can be dried until the moisture content of the cocoa shells is lower than 12%. Also, the moisture content of the dried beans should be lower than 7%. To shorten the drying time, cocoa beans can be dried with hot air of lower humidity.

Example 8. Effect of Pre-Washing on Cocoa Liquor and Cocoa Shells in the Scale-Up Trials Analyses.

The beans, nibs, and shells were analyzed for moisture content (or % $H_2O$), which is the percentage loss of mass on drying for 4 hours at 103° C. and measured as a weight percentage (wt %). The pH of the cocoa liquor was measured by standard, industry-accepted methods. The fat content (Fat %) was determined according to the Soxhlet extraction method, where the measurements are given by percentage by mass of fat and other components extractable with petroleum ether. The cocoa shells and cocoa liquor were analyzed for total iron content ("Fe"), aluminum ("Al"), silicon ("Si"), ochratoxin A, and potassium ("K").

Conclusions.

Cocoa beans were prepared as described in Example 7. Lab analyses did not identify large differences in the concentrations of the heavy metals and toxins in the liquor produced from beans with and without a pre-washing treatment. The results are presented in Table 10 and Table 11.

TABLE 10

Results of the analyses for the cocoa shells for scale-up trials.

| Shells | Trial 1 | Trial 2 | Trial 3 | Reference |
| --- | --- | --- | --- | --- |
| % $H_2O$ | 12.8 | 18.2 | 18.4 | 11.8 |
| Total Iron as Fe (mg/kg) | 610 | 600 | 500 | 520 |
| Aluminum as Al (mg/kg) | 750 | 720 | 620 | 810 |
| Silicon as Si (%) | 0.58 | 0.53 | 0.46 | 0.59 |
| Potassium as K (%) | | | 3.7 | |
| Ochratoxin A (µg/kg) | <0.4 | <0.4 | <0.4 | <0.4 |

TABLE 11

Results of the analyses of the cocoa liquor for scale-up trials.

| Cocoa liquor | Trial 1 | Trial 2 | Trial 3 | Reference |
| --- | --- | --- | --- | --- |
| PH | 5.88 | 5.86 | 6.14 | 5.85 |
| % Fat | 57.74 | 58.24 | 58.2 | 58.22 |

TABLE 11-continued

Results of the analyses of the cocoa liquor for scale-up trials.

| Cocoa liquor | Trial 1 | Trial 2 | Trial 3 | Reference |
| --- | --- | --- | --- | --- |
| % $H_2O$ | 0.92 | 0.89 | 0.89 | 0.92 |
| Total Iron as Fe (mg/kg) | 43 | 36 | 51 | 36 |
| Aluminum as Al (mg/kg) | <10 | <10 | <10 | <10 |
| Silicon as Si (%) | <0.01 | <0.01 | <0.01 | <0.01 |
| Potassium as K (%) | 1.1 | 1.1 | 1.1 | 1.1 |
| Ochratoxin A (µg/kg) | <0.4 | <0.4 | <0.4 | <0.4 |

Example 9: Effect of Pre-Washing on Cocoa Beans and on Cocoa Butter in the Scale-Up Trials Analyses.

The free fatty acid content (FFA), expressed as % oleic acid, was determined by determining the amount of base needed to neutralize oleic acid. In the titration method for determining FFA, about 5-10 g of liquid cocoa butter was poured into a 250 ml Erlenmeyer flask. About 50 ml of the diethylether-ethanol mixture was used to dissolve the cocoa butter by swirling. The diethylether-ethanol mixture was obtained by mixing 3 parts diethyl ether p.a. with two parts ethanol (p.a. 96%) and then neutralized before use with 0.1N KOH solution against phenolphthalein. Next, a few drops of 1% phenolphthalein solution in ethanol was added. The mixture was titrated with 0.1N KOH (Normality T) to the end point, which is when the pink color persists for at least 10 seconds. The amount of KOH used during the titration was recorded in ml. The FFA, expressed as oleic acid, is calculated with the formula: ffa=28.2×T×V/m, where T=the Normality of the standardized KOH solution, V=ml of the standardized KOH solution, and m=the mass (g) of the cocoa butter sample.

For % $H_2O$ Beans and nib: 5 grams of ground material was dried for 4 hrs at 103° C. and weighed before and after. Liquor is measured by Karl Fisher titration. For fat content: material was extracted with a solvent which differs in density to cocoa butter. The density is measured and correlates to an amount of butter. FT-NIR (Fourier transform near-infrared spectroscopy) method was used to measure —COOH groups, or double or triple bonds of hydrocarbons. The iodine value (IV) of cocoa butter is the number of grams of halogen absorbed by 100 g of fat and expressed as the weight of iodine.

Conclusions.

Cocoa beans were prepared as described in Example 7. As shown in Table 12, the high amount of the FFA value in the cocoa beans can be reduced by pre-washing of the beans. However, pre-washing did not affect the fat content (% fat) of the cocoa beans.

TABLE 12

Results of the analysis of the beans after washing and drying.

| Sample | Description of Sample | % $H_2O$ (stove) | % Fat (DMA) | FFA (titration) | FFA (NIR) | I.V. (NIR) |
| --- | --- | --- | --- | --- | --- | --- |
| Reference | Raw beans without any treatment | 6.42 | 47.46 | 4.09 | 4.08 | 34.63 |
| Trial 1 | Washed in cold water (17° C.) for 5 min Dried with dry air of (22-25° C.) | 6.63 | 46.43 | 3.35 | 3.38 | 33.92 |
| Trial 2 | Washed in hot water (60° C.) for 5 min Dried with dry air of (22-25° C.) | 9.46 | 48.98 | 2.94 | 2.91 | 34.72 |

TABLE 12-continued

Results of the analysis of the beans after washing and drying.

| Sample | Description of Sample | % H₂O (stove) | % Fat (DMA) | FFA (titration) | FFA (NIR) | I.V. (NIR) |
|---|---|---|---|---|---|---|
| Trial 3 | Washed in hot water (60° C.) for 5 min Washed in hot potash solution (60° C.) for 5 min Dried with dry air of (22-25° C.) | 9.77 | 47.19 | 2.94 | 2.91 | 34.24 |

In these trials, the initial FFA value was reduced by 32% after pre-washing of the cocoa beans. The FFA of the cocoa butter from the final cocoa liquor was reduced to 2.9%, where the FFA of the initial cocoa beans was 4.1% (see Table 13). The pre-washing step can be further optimized to reduce the high FFA values of inferior quality beans to the desirable value of 1.5%.

TABLE 13

Comparison of the cocoa butter analysis in the scale-up trials.

| | Cocoa butter from cocoa beans | | | Cocoa butter from cocoa liquor | | |
|---|---|---|---|---|---|---|
| Sample | FFA (titration) | FFA (NIR) | I.V. (NIR) | FFA (titration) | FFA (NIR) | I.V. (NIR) |
| Reference | 4.08 | 4.09 | 34.63 | 3.52 | 3.58 | 33.9 |
| Trial 1 | 3.35 | 3.38 | 33.92 | 3.06 | 3.05 | 34.3 |
| Trial 2 | 2.94 | 2.91 | 34.72 | 3.02 | 3.06 | 34.3 |
| Trial 3 | 2.94 | 2.9 | 34.24 | 2.8 | 2.94 | 34.2 |

Example 10: Effect of Pre-Washing on Color Measurements in the Scale-Up Trials

Analyses.

Color measurements were determined as described in Example 5.

Conclusion.

Cocoa beans were prepared as described in Example 7. Pre-washing in water and potash had no influence on the final color of the liquor and powder. Without wishing to be limited by theory, the pre-washing step probably is too short or the potash concentration too low to affect the various polyphenols in the cocoa beans.

TABLE 14

Summary of all the color measurements of scale-up trials.

| | Trial 1 | Trial 2 | Trial 3 | Reference |
|---|---|---|---|---|
| Intrinsic color in water | | | | |
| Cocoa Liquor | | | | |
| L | 26.03 | 26.24 | 25.67 | 26.26 |
| C | 27.85 | 28.25 | 28.61 | 28.1 |
| H | 54.67 | 54.74 | 54.36 | 54.81 |
| Dry color | | | | |
| L | 13.27 | 13.86 | 13.87 | 13.75 |
| C | 20.6 | 20.29 | 19.85 | 20.12 |
| H | 48.2 | 47.56 | 46.2 | 47.96 |
| Intrinsic color in water | | | | |
| Cocoa powder | | | | |
| L | 23.61 | 24.13 | 22.68 | 24.25 |
| C | 27.95 | 28.45 | 28.37 | 28.32 |
| H | 53.96 | 54.11 | 53.51 | 54.28 |

Example 11. Effect of Pre-Washing on Aroma of Cocoa Liquor in the Scale-Up Trials Analyses.

Various aroma compounds were determined by gas chromatography-mass spectrometry (GC-MS).

Conclusion.

Figure 6A:
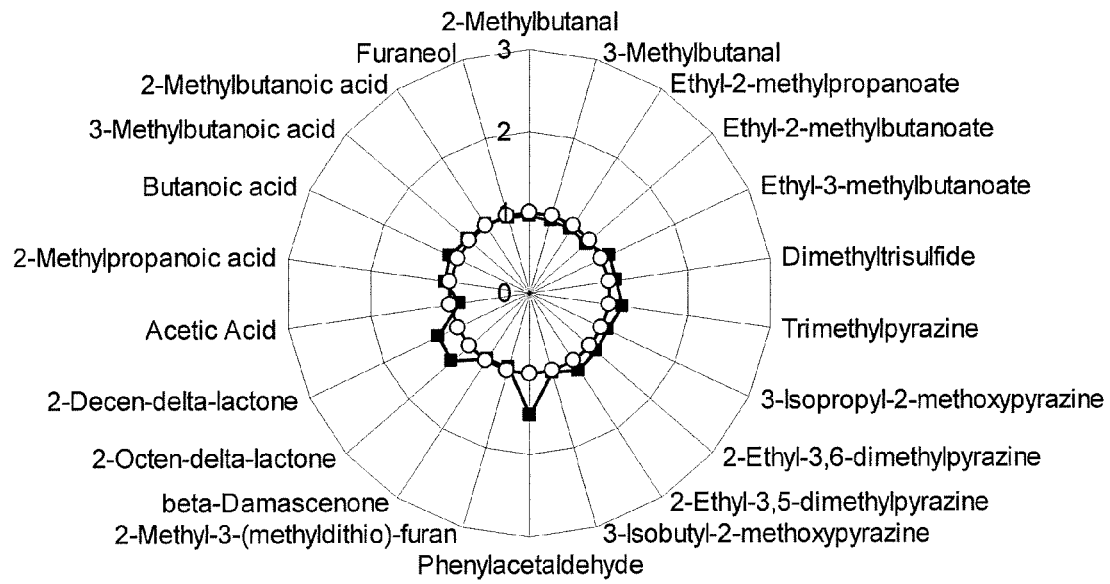
FIG. 6A-6C are graphs showing the relative levels of aroma compounds in cocoa liquor for the scale-up trials.
Figure 6B:
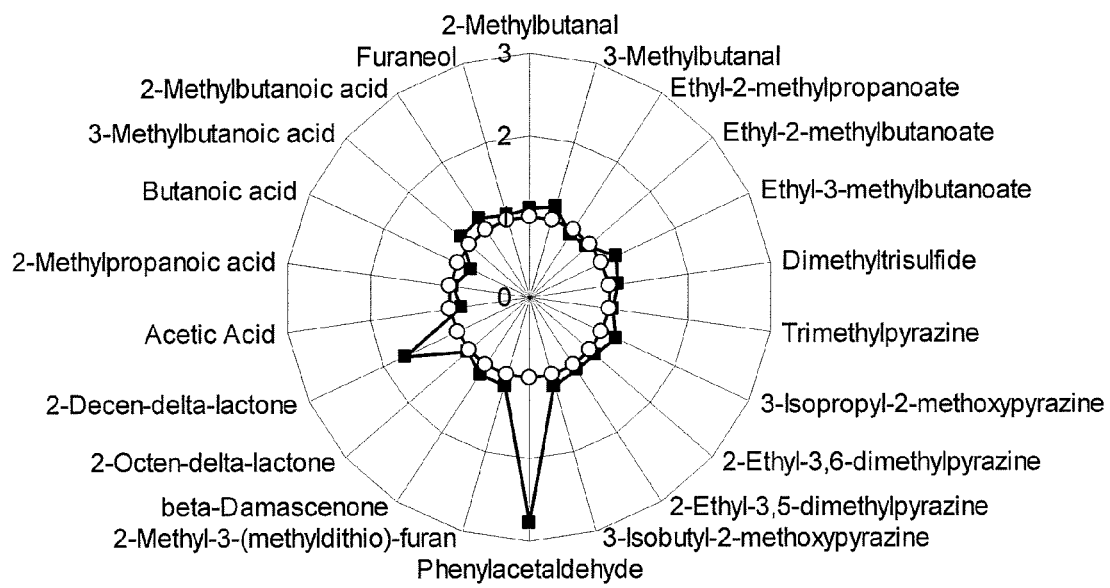
Figure 6C:
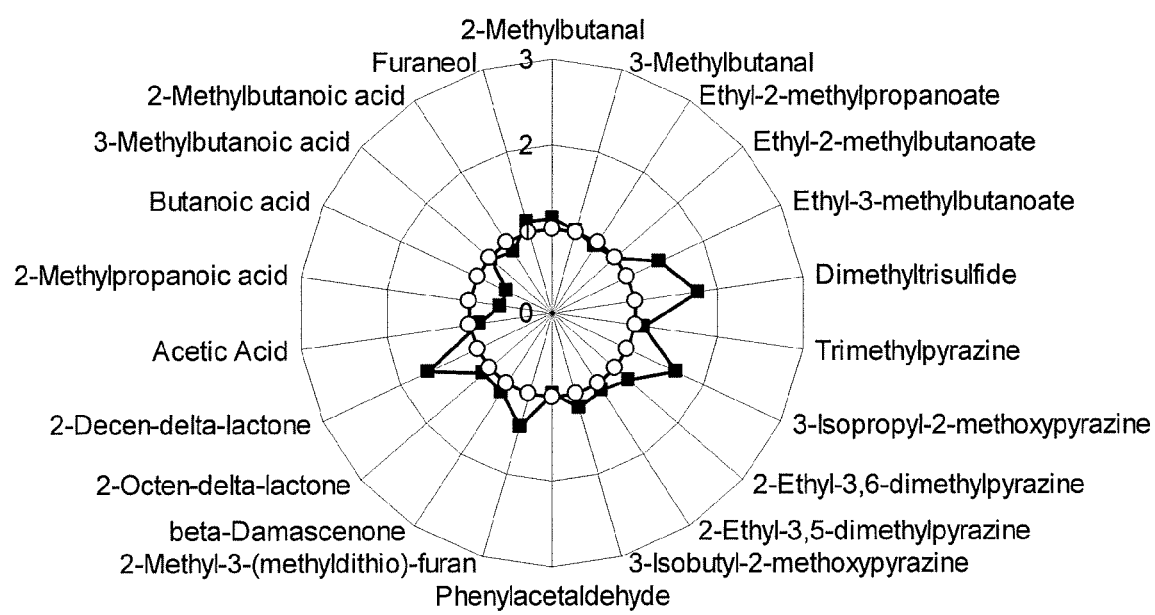

Cocoa beans were prepared as described in Example 7. Pre-washing did not affect the flavor profile of the cocoa liquor as long as (see Table 15). FIG. 6A-6C show the levels of aroma compounds in cocoa liquor for the scale-up trials. These levels are relative to the value in the column labeled "Reference" in Table 15. Relative values were obtained by taking the actual determined values and dividing it by the values determine for the reference cocoa liquor.

TABLE 15

Aroma analysis of cocoa liquor (all concentrations in μg/kg)

| Aroma compounds | Trial 1 | Trial 2 | Trial 3 | Reference | KA - Massa |
|---|---|---|---|---|---|
| 2-Methylbutanal | 3661.67 | 4210.43 | 4246.15 | 3829.83 | 620.15 |
| 3-Methylbutanal | 6309.85 | 7750.12 | 6846.86 | 6717.46 | 1814.13 |
| Ethyl-2-methylpropanoate | 10.59 | 10.27 | 10.50 | 11.25 | 0.06 |
| Ethyl-2-methylbutanoate | 11.27 | 11.41 | 11.93 | 12.00 | <LOD |
| Ethyl-3-methylbutanoate | 6.86 | 7.56 | 8.86 | 6.28 | <LOD |
| Dimethyltrisulfide | 156.93 | 158.82 | 252.36 | 142.45 | 13.62 |
| Trimethylpyrazine | 1435.13 | 1306.81 | 1382.26 | 1230.50 | 340.35 |
| 3-Isopropyl-2-methoxypyrazine | 0.49 | 0.55 | 0.75 | 0.46 | 0.40 |
| 2-Ethyl-3,6-dimethylpyrazine | 214.60 | 209.40 | 241.00 | 196.55 | 34.51 |
| 2-Ethyl-3,5-dimethylpyrazine | 175.17 | 163.70 | 169.17 | 153.77 | 60.21 |
| 3-Isobutyl-2-methoxypyrazine | 1.97 | 2.21 | 2.28 | 1.96 | 0.87 |
| Phenylacetaldehyde | 80.47 | 148.54 | 50.75 | 53.64 | 100.20 |
| 2-Methyl-3-(methyldithio)-furan | 4.47 | 5.37 | 6.62 | 4.72 | 1.97 |
| beta-Damascenone | 1.63 | 1.92 | 1.88 | 1.68 | 1.59 |
| 2-Octen-delta-lactone | 105.04 | 83.85 | 89.49 | 81.72 | 145.30 |

TABLE 15-continued

Aroma analysis of cocoa liquor (all concentrations in μg/kg)

| Aroma compounds | Trial 1 | Trial 2 | Trial 3 | Reference | KA - Massa |
|---|---|---|---|---|---|
| 2-Decen-delta-lactone | 59.43 | 81.28 | 77.61 | 47.63 | 174.17 |
| Acetic Acid | 140156.76 | 135455.96 | 138831.66 | 159605.59 | 165670.55 |
| 2-Methylpropanoic acid | 4196.52 | 3701.22 | 2438.73 | 3892.82 | 988.54 |
| Butanoic acid | 227.28 | 167.44 | 126.67 | 208.03 | 82.51 |
| 3-Methylbutanoic acid | 3663.35 | 4042.84 | 3484.31 | 3563.70 | 1655.33 |
| 2-Methylbutanoic acid | 3113.22 | 3554.33 | 2653.41 | 3051.88 | 1424.61 |
| Furaneol | 457.62 | 496.94 | 531.27 | 474.29 | 263.32 |

The Reference sample is a liqour sample made on lab scale of the untreated beans, KA Massa is a special liquor which we use a standard for this analyses, and LOD = Limit Of Detection.

Example 12: Effect of Pre-Washing on Odor and Flavor of Cocoa Liquor in the Scale-Up Trials Analyses.

The flavor of cocoa liquor was evaluated using a standard sample as a reference, where the evaluation is a combination of a descriptive test and a difference test (paired comparison test). The cocoa liquor was evaluated for various sensory aspects and flavor notes, including: cocoa; bitter; rich, which is a full flavor intensity contrasting with watery; bouquet, which is a general term covering all flavor elements over and above the cocoa notes, such as aromatic, floral, and fruity notes; acid; astringent, which can be described as puckering; and acrid, which is a burnt and harsh aromatic taste. Any off-flavors were also noted.

Conclusions.

Cocoa beans were prepared as described in Example 7. Table 16 shows the comparison of the cocoa liquor from the reference sample with the cocoa liquor obtained by Trial 1. For Trial 1, cocoa beans were rinsed with cold water of 17° C. for 5 minutes and dried with air of 22° C. to 25° C. The Reference, sample is untreated beans. As shown in Table 16, there is a difference of 1.4 in odor and taste between the reference cocoa liquor and the cocoa liquor obtained from Trial 1. However, this difference is within the production standard of 3.0. The reference sample had slightly more acidity (0.4) compared with Trial 1, whereas the sample from Trial 1 had slightly more bitterness (0.6), astringency (0.4) and more acidity (0.2). The sample from Trial 1 also had an off-flavor of 0.4 described as unknown.

TABLE 16

Odor and flavor tests compared to reference cocoa liquor in hot water.

| | Trial 1 | | | |
|---|---|---|---|---|
| | Odor | n | Taste | n |
| Difference | 0.6 | 5 | 0.8 | 5 |
| Cocoa | | | | |
| Bitter | | | 0.6 | 3 |
| Rich | | | | |
| Bouquet | | | | |
| Acid | 0.0 | 2 | 0.2 | 1 |
| Astringent | | | 0.4 | 2 |
| Acrid | −0.4 | 1 | 0.0 | |
| Alkaline | | | | |
| Off-flavors | 0.2 | 1 | 0.2 | 1 |
| | unknown | 1 | unknown | 1 |

Table 17 shows the comparison of the cocoa liquor from the reference sample with the cocoa liquor obtained by Trial 2 and Trial 3.

TABLE 17

Odor and flavor tests compared to reference cocoa liquor in hot water.

| | Trial 2 | | | | Trial 3 | | | |
|---|---|---|---|---|---|---|---|---|
| | Odor | n | Taste | n | Odor | n | Taste | n |
| Difference | 1.0 | 5 | 1.0 | 5 | 1.6 | 5 | 0.6 | 5 |
| Cocoa | −0.4 | 1 | | | −0.4 | 1 | | |
| Bitter | | | 0.6 | 2 | | | −0.2 | 1 |
| Rich | | | | | | | | |
| Bouquet | | | −0.2 | 1 | | | −0.2 | 1 |
| Acid | −0.2 | 1 | −0.2 | 1 | −0.2 | 1 | | |
| Astringent | | | 0.2 | 1 | | | 0.2 | 1 |
| Acrid | | | −0.2 | 1 | | | −0.4 | 2 |
| Alkaline | | | | | | | | |
| Off-flavors | 1.0 | 3 | 0.4 | 2 | 1.6 | 4 | 0.2 | 1 |
| | soapy | 1 | coarse | 1 | moldy | 1 | burnt | 1 |
| | rancid | 1 | unknown | 1 | | | | |

In Trial 2, cocoa beans were rinsed with hot water of 60° C. for 5 minutes and dried with air of 22° C. to 25° C. As shown in Table 17, there is a difference of 2.0 in odor and taste between the reference cocoa liquor and the cocoa liquor obtained from Trial 2. However, this difference is within the production standard of 3.0. The reference sample had slightly more cocoa (0.4), more acidity (0.4), more acridity (0.2) and more bouquet (0.2) compared with Trial 1. The sample from Trial 1 had slightly more bitterness (0.6) and astringency (0.2). The sample from Trial 1 also had an off-flavor (1.4) described as unknown, soapy, rancid, camphoric and coarse.

In Trial 3, cocoa beans were washed with hot water of 60° C. for 5 minutes, rinsed with a 5 wt % potash solution of 60° C. for 5 minutes, and dried with air of 22° C. to 25° C. As shown in Table 17, there is a difference 2.2 in odor and taste between the reference cocoa liquor and the cocoa liquor obtained from Trial 3. However, this difference is within the production standard of 3.0. The reference sample had slightly more cocoa (0.4), more acidity (0.4), bitterness (0.2), acidity (0.2) and more bouquet (0.2) compared with Trial 3. The sample from Trial 3 had slightly more astringency (0.2). The sample from Trial 3 also had an off-flavor (1.8) described as unknown, moldy, ammoniac, Lysol, and burnt.

Example 13: Color Sorting of Cocoa Beans

Two kilograms of cocoa beans were sorted by hand. Before sorting, the cocoa beans had a free fatty acid content of about 3.10%. The beans were sorted and resulted in the following amounts of cocoa beans: about 76.9% brown beans (FFA content of 2.11%), about 13.5% of a mix of brown/black beans (FFA content of 6.9%) and about 9.6% black beans (FFA content of 9.91%).

Seventy three metric tons (73 mT) of cocoa beans having an incoming FFA content of 4.5% were color sorted with a RADIX AUTOSORT brand color sorter, available from Radix Systems, Ltd., Winchester, England. The color sorter was trained to recognize the cocoa beans and sort the cocoa beans as being black (rejected) and brown (kept).

The beans were sorted into four initial categories: 1) 18.7 mT of brown beans with a FFA content of 2.85% were kept (92% were real brown and 8% were real black); 2) 13.9 mT of beans with a FFA content of 3.74% had a high amount of fines were rejected; 3) 22 mT of brown beans with a FFA content of 1.79% were kept; and 4) 18.4 mT of black beans with a FFA content of 5.81% were rejected (76% were real black and 24% were real brown). The cocoa beans in category 1) were sieved and 1.2 mT (FFA content of 6.4%) were rejected as having fines, and the remaining 17.5 mT (FFA content of 1.74%) of cocoa beans in category 1) were combined with the cocoa beans of category 3), for a total of 39.5 mT of accepted cocoa beans, having a FFA content of 1.76%.

The 39.5 mT of accepted cocoa beans were processed into cocoa liquor having a FFA content of 1.2% and a solidification time of 54, pressed into cocoa butter having a FFA content of 2.11% and a solidification time of >120, the cocoa butter was filtered and had a FFA content of 1.56% and a solidification time of >120, and the filtered cocoa butter was deodorized and had a FFA content of 1.49% and a solidification time of >120.

Thus, this embodiment indicates that color sorting of cocoa beans to remove black or darker beans optionally combined with sieving the cocoa beans to remove the fines results in a cocoa product with a reduced free fatty acid content.

The present invention has been described with reference to certain exemplary and illustrative embodiments, compositions and uses thereof. However, it will be recognized by persons having ordinary skill in the art that various substitutions, modifications or combinations of any of the exemplary embodiments may be made without departing from the scope of the invention. Thus, the invention is not limited by the description of the exemplary and illustrative embodiments, but rather by the appended claims.

The invention claimed is:

1. A method of reducing free fatty acids in cocoa butter, the method comprising:
    placing inferior, fermented, dried, brown, intact cocoa beans in contact with a pre-washing solution having a temperature of between 15-50° C. to form pre-washed cocoa beans;
    wherein the pre-washing solution includes an alkali and contact with the pre-washing solution is not sufficient to cause peeling of the inferior, fermented, dried, brown, intact cocoa beans and wherein cocoa butter obtained from the inferior, fermented, dried, brown, intact cocoa beans has a free-fatty acid content of more than 1.75%;
    removing the pre-washed cocoa beans from the pre-washing solution; and
    processing the pre-washed cocoa beans into cocoa liquor;
    wherein cocoa butter obtained from the cocoa liquor of the pre-washed cocoa beans has free-fatty acid content of less than 1.75%.

2. The method of claim 1, wherein the pre-washing solution comprises between 1 wt % to 5 wt % of the alkali.

3. The method of claim 1, wherein the pre-washing solution has a pH of from 8 to 12.5.

4. The method of claim 1, wherein the cocoa liquor has a pH of less than 6.0.

5. The method of claim 1, further comprising rinsing the prewashed cocoa beans after being placed in contact with the pre-washing solution.

6. The method of claim 1, the method further comprising drying the pre-washed cocoa beans after being placed in contact with the pre-washing solution.

7. The method of claim 1, wherein processing the pre-washed cocoa beans into cocoa liquor comprises:
    roasting the pre-washed cocoa beans;
    removing shells from the pre-washed cocoa beans, thus producing cocoa nibs; and
    grinding the cocoa nibs into the cocoa liquor.

8. The method of claim 1, wherein the pre-washing solution is water.

9. The method of claim 1, further comprising removing darker or black cocoa beans from the inferior, fermented, dried, brown, intact cocoa beans.

10. The method of claim 7, further comprising alkalizing the cocoa nibs before grinding the cocoa nibs into the cocoa liquor.

11. The method of claim 1, wherein the pre-washing solution has a temperature of between 30-50° C.

12. The method of claim 1, wherein the cocoa liquor produced from the pre-washed cocoa beans has a color value selected of an L value of 15.28-15.85, a C value of 18.05-18.82, and an H value of 37.67-38.52, or an L value of 25.67-26.24, a C value of 27.85-28.61, and an H value of 54.36-54.74.

13. The method of claim 1, further comprising sieving the inferior, fermented, dried, brown, intact cocoa beans.

14. The method of claim 1, wherein the inferior, fermented, dried brown, intact cocoa beans have a moisture content of between 5.28%-8.44% by weight before being placed in contact with the pre-washing solution.

15. A method of reducing contaminants from fermented, dried, brown, and intact cocoa beans, the method comprising:
    placing fermented, dried, brown, and intact cocoa beans having a moisture content of between 5.28%-8.44% by weight in contact with a pre-washing solution;
    wherein the pre-washing solution includes an alkali and contact with the pre-washing solution is not sufficient to cause peeling of the fermented, brown, and intact cocoa beans;
    removing the fermented, brown, and intact cocoa beans from the pre-washing solution;
    drying the pre-washed, fermented, brown and intact cocoa beans; and
    processing the pre-washed, fermented, brown, dried and intact cocoa beans into cocoa liquor.

16. A method of reducing contaminants from cocoa beans, the method comprising:
    subjecting fermented, dried, brown, intact cocoa beans having one or more contaminants of toxins, metals, or free fatty acids to a non-peeling alkali treatment by washing the fermented, dried, brown, intact cocoa beans with a pre-washing solution comprising an aqueous solution of an alkali;
    removing the fermented, dried, brown, intact cocoa beans from the pre-washing solution; and
    processing the pre-washed fermented, dried, brown, intact cocoa beans into cocoa liquor;

wherein the cocoa liquor has a reduced amount of the one or more contaminants of toxins, metals, or free fatty acids.

17. The method of claim 16, wherein the fermented, dried, brown, intact cocoa beans are washed at a temperature of lower than 75° C. and at a pH between 9-12.

18. The method of claim 17, wherein the pre-washing solution comprises between 1 wt % to 5 wt % of the alkali.

19. The method of claim 16, wherein processing the pre-washed fermented, dried, brown, intact cocoa beans into cocoa liquor comprises drying the pre-washed fermented, dried, brown, intact cocoa beans; removing shells from the pre-washed cocoa beans thus producing cocoa nibs, and grinding the nibs into cocoa liquor.

20. The method of claim 19, wherein the fermented, dried, brown, intact cocoa beans are washed at a temperature between 15° C. to 90° C. and at a pH from 8 to 12.5.

* * * * *